(12) United States Patent
De Paiva et al.

(10) Patent No.: US 11,699,434 B2
(45) Date of Patent: Jul. 11, 2023

(54) SYSTEMS, COMPUTER-IMPLEMENTED METHODS, AND COMPUTER PROGRAM PRODUCTS FOR DATA SEQUENCE VALIDITY PROCESSING

(71) Applicant: ARRIA DATA2TEXT LIMITED, Aberdeen (GB)

(72) Inventors: Daniel da Silva De Paiva, Brighton (GB); Gowri Somayajulu Sripada, Westhill (GB); Craig Thomson, Balmedie (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 256 days.

(21) Appl. No.: 17/112,670

(22) Filed: Dec. 4, 2020

(65) Prior Publication Data
US 2022/0180863 A1 Jun. 9, 2022

(51) Int. Cl.
G10L 15/183 (2013.01)
G06F 16/33 (2019.01)
G10L 15/26 (2006.01)
G10L 15/06 (2013.01)

(52) U.S. Cl.
CPC ........ *G10L 15/183* (2013.01); *G06F 16/3346* (2019.01); *G10L 15/063* (2013.01); *G10L 15/26* (2013.01)

(58) Field of Classification Search
CPC ..... G10L 15/183; G10L 15/063; G10L 15/26; G06F 16/3346; G06F 40/30
See application file for complete search history.

(56) References Cited

U.S. PATENT DOCUMENTS

| | | | |
|---|---|---|---|
| 10,019,587 B2* | 7/2018 | Ladikov | G06F 21/604 |
| 11,340,923 B1* | 5/2022 | Kapoor | G10L 15/22 |
| 11,392,773 B1* | 7/2022 | Gangadharaiah | G06N 20/00 |
| 2016/0124944 A1* | 5/2016 | Andreoli | G06F 40/51 |
| | | | 704/2 |

(Continued)

OTHER PUBLICATIONS

Gao, Jianfeng, et al. "Toward a unified approach to statistical language modeling for Chinese." ACM Transactions on Asian Language Information Processing (TALIP) 1.1 (2002): pp. 3-33 (Year: 2002).*

(Continued)

*Primary Examiner* — Jesse S Pullias
*Assistant Examiner* — Michael C. Lee
(74) *Attorney, Agent, or Firm* — Alston & Bird LLP

(57) ABSTRACT

Embodiments provide for improved data sequence validity processing, for example to determine validity of sentences or other language within a particular language domain. Such improved processing is useful at least for arranging data sequences based on determined validity, and/or making determinations and/or performing actions based on the determined validity. A determined probability (e.g., transformed into the perplexity space) of each token appearing in a data sequence is used in any of a myriad of manners to perform such data sequence validity processing. Example embodiments provide for generating a perplexity value set for each data sequence in a plurality of data sequences, generating a probabilistic ranking set for the plurality of data sequences based on the perplexity value sets and at least one sequence ranking metric, and generating an arrangement of the plurality of data sequences based on the probabilistic ranking set.

18 Claims, 17 Drawing Sheets

(56) References Cited

U.S. PATENT DOCUMENTS

| | | | | |
|---|---|---|---|---|
| 2016/0125751 | A1* | 5/2016 | Barker | G06F 40/30 434/322 |
| 2018/0365220 | A1* | 12/2018 | Chakraborty | G06N 3/0454 |
| 2020/0302023 | A1* | 9/2020 | Bouamor | G06N 3/0445 |
| 2021/0056266 | A1* | 2/2021 | Ma | G06F 40/56 |

OTHER PUBLICATIONS

Sethy, Abhinav, et al. "An iterative relative entropy minimization-based data selection approach for n-gram model adaptation." IEEE transactions on audio, speech, and language processing 17.1 (2009): 13-23. (Year: 2009).*

Huang, Jian, et al. "Exploring web scale language models for search query processing." Proceedings of the 19th international conference on World wide web. 2010, pp. 1-10. (Year: 2010).*

Toral, Antonio, et al. "Linguistically-augmented perplexity-based data selection for language models." Computer Speech & Language 32.1 (2015): 11-26. (Year: 2015).*

Akhtar, Md Shad, et al. "Language-agnostic model for aspect-based sentiment analysis." Proceedings of the 13th International Conference on Computational Semantics-Long Papers. 2019, pp. 1-11. (Year: 2019).*

Saha, Punyajoy, et al. "Hatemonitors: Language agnostic abuse detection in social media." arXiv preprintarXiv:1909.12642 (2019) pp. 1-8 (Year: 2019).*

Baker, J. K. (1975). The DRAGON system—An overview. IEEE Transactions on Acoustics, Speech, and Signal Processing, ASSP-23(1), 24-29.

Y. Bengio, R. Ducharme, P. Vincent, and C. Janvin. (2003) A neural probabilistic language model. JMLR, 3:1137-1155, 2003.

I. Langkilde-Geary (2000). Forest-based statistical sentence generation. In Proc. ANLP-NAACL'00, pp. 170-177.

* cited by examiner

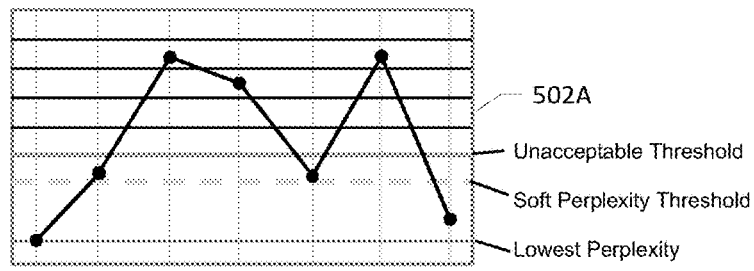
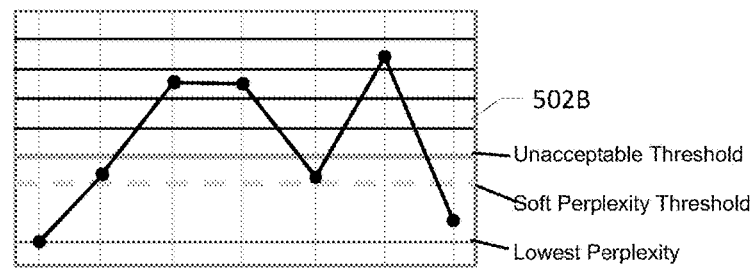
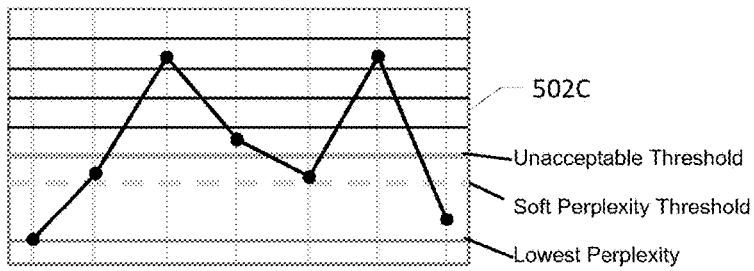
FIG. 5

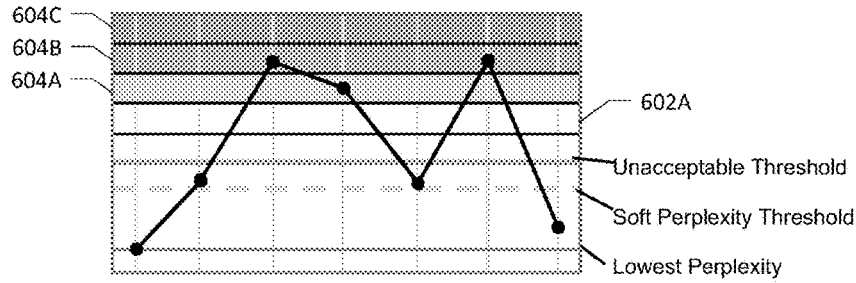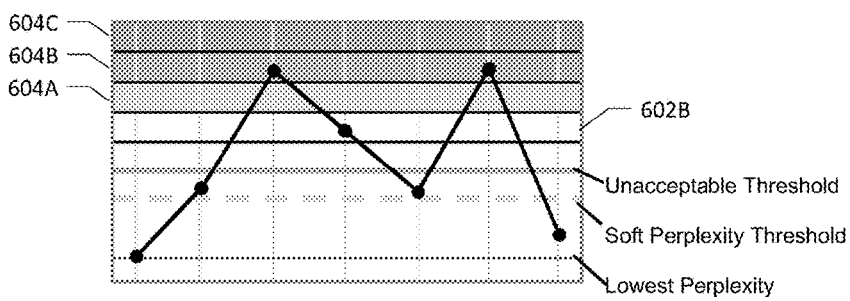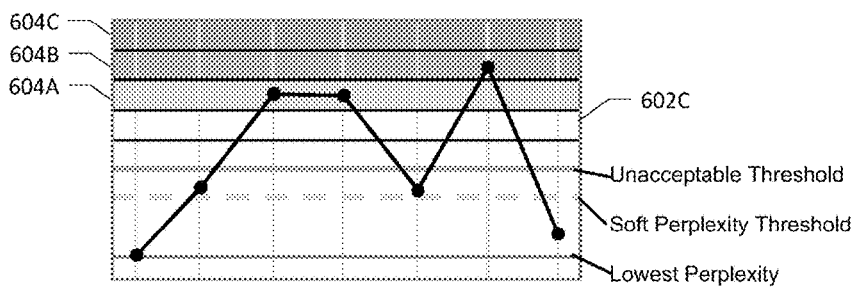
FIG. 6

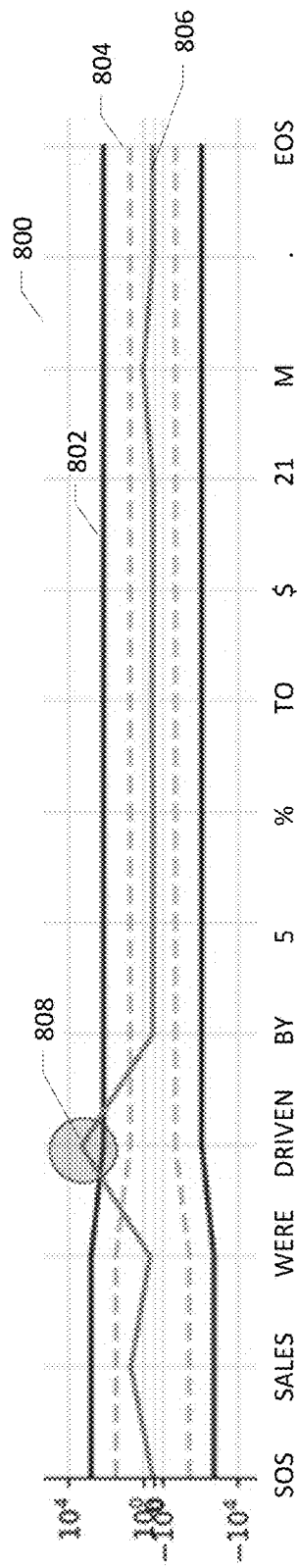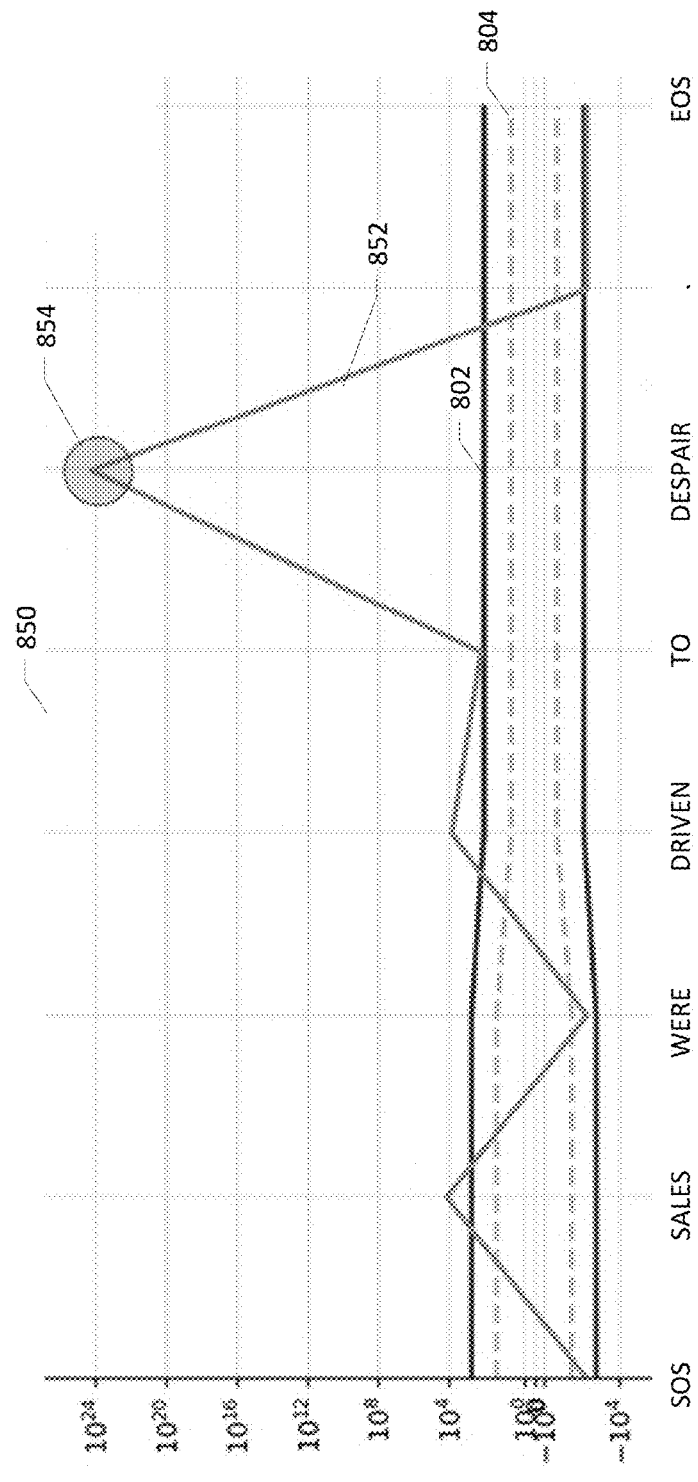

SYSTEMS, COMPUTER-IMPLEMENTED METHODS, AND COMPUTER PROGRAM PRODUCTS FOR DATA SEQUENCE VALIDITY PROCESSING

TECHNOLOGICAL FIELD

Embodiments of the present disclosure generally relate to natural language processing, and specifically to quantifying and/or identifying invalid language.

BACKGROUND

Quantifying the validity of a data sequence, for example a sentence, in natural language processing is a difficult task that computing systems are not configured to perform automatically. In this regard, conventional systems do not quantify the validity of a particular data sequence or multiple data sequences, and similarly cannot identify whether one or more data sequences are valid or invalid within a particular domain of language. Applicant has discovered problems with current implementations of data sequence validity processing. Through applied effort, ingenuity, and innovation, Applicant has solved many of these identified problems by developing embodiments of the present disclosure, which are described in detail below.

BRIEF SUMMARY

In general, embodiments of the present disclosure provided herein data sequence validity processing utilizing probabilities and probability-derived concepts, for example entropy and perplexity. Other implementations for data sequence validity processing utilizing probabilities and probability-derived concepts (e.g., perplexity) will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for arranging a plurality of data sequences is provided. The computer-implemented method may be executed via one or more computing devices embodied in hardware, software, firmware, and/or a combination thereof. An example embodiment computer-implemented method includes, for each data sequence of a plurality of data sequences, each data sequence comprising a token sequence: calculating, utilizing a language model, a perplexity value set associated with the data sequence, wherein the perplexity value set comprises a perplexity value for each data token in token sequence of the data sequence; and generating a probabilistic ranking set for the plurality of data sequences, the probabilistic ranking set including a probabilistic ranking for each data sequence in the plurality of data sequences, and the probabilistic ranking set generated based on at least one sequence arrangement metric and the perplexity value set for each data sequence of the plurality of data sequences. The example computer-implemented method further includes generating an arrangement of the plurality of data sequences based on the probabilistic ranking set.

Additionally or alternatively, in some embodiments of the example computer-implemented method, the example computer-implemented method further includes providing the arrangement of the plurality of data sequences to a client device for outputting.

Additionally or alternatively, in some embodiments of the example computer-implemented method, the example computer-implemented method further includes identifying, based on the arrangement of the plurality of data sequences, at least one invalid data sequence from the plurality of data sequences.

Additionally or alternatively, in some embodiments of the example computer-implemented method, the example computer-implemented method further includes excluding at least one data sequence from the plurality of data sequences based on the arrangement of the plurality of data sequences.

Additionally or alternatively, in some embodiments of the example computer-implemented method, the language model is trained on a domain-specific set of language training data.

Additionally or alternatively, in some embodiments of the example computer-implemented method, generating the probabilistic ranking set for the plurality of data sequences based on at least one sequence arrangement metric and the perplexity value set for each data sequence includes generating an average sequence perplexity value set including an average sequence perplexity value for each data sequence of the plurality of data sequences by, for each data sequence of the plurality of data sequences: determining the average sequence perplexity value for the data sequence, wherein the average sequence perplexity value represents a mean value based on the perplexity value for each data token in the token sequence of the data sequence; and generating the probabilistic ranking set based on the average sequence perplexity value set.

Additionally or alternatively, in some embodiments of the example computer-implemented method, generating the probabilistic ranking set for the plurality of data sequences based on at least one sequence arrangement metric and the perplexity value set for each data sequence includes generating an area violating threshold value set including an area violating threshold value for each data sequence of the plurality of data sequences by, for each data sequence of the plurality of data sequences: determining the area violating threshold value for the data sequence, wherein the area violating threshold value is based on the perplexity value set for the data sequence and an unacceptable perplexity threshold; and generating the probabilistic ranking set based on the area violating threshold value set.

Additionally or alternatively, in some embodiments of the example computer-implemented method, generating the probabilistic ranking set for the plurality of data sequences based on at least one sequence arrangement metric and the perplexity value set for each data sequence comprises: generating a bucket-based sequence perplexity value including a bucket-based sequence perplexity values for each data sequence of the plurality of data sequences by, for each data sequence of the plurality of data sequences: determining an unacceptable bucket token count associated with the data sequence; and determining the bucket-based sequence perplexity values for the data sequence based at least on the unacceptable bucket token count associated with the data sequence; and generating the probabilistic ranking set based on the bucket-based sequence perplexity value.

Additionally or alternatively, in some such embodiments of the example computer-implemented method, the probabilistic ranking set is determined utilizing the equation $$a = \frac{1}{m}\sum_{i=0}^{n}(X^i)C_i,$$

where X represents a number greater than one, a represents the probabilistic ranking for a particular data sequence of the plurality of data sequences, m represents the number of tokens in the particular data sequence, i represents the order of unacceptable buckets, n represents a number of unacceptable buckets minus 1, and $C_i$ represents a number of tokens in an unacceptable bucket represented by i.

Additionally or alternatively, in some embodiments of the example computer-implemented method, the language model is language agnostic and direction agnostic.

Additionally or alternatively, in some embodiments of the example computer-implemented method, the example computer-implemented method further includes collecting a set of training data sequences associated with a language domain, wherein the set of training data sequences is collected from one or more external computing devices associated with the language domain; and training the language model based on the set of training data.

In accordance with another aspect of the disclosure, an apparatus for arranging a plurality of data sequences is provided. An example apparatus includes at least one processor and at least one memory, the at least one memory having computer-coded instructions stored thereon. The computer-coded instructions, in execution with the at least one processor, configures the apparatus to perform any one of the example computer-implemented methods described herein.

Another example apparatus includes means for performing each step of any one of the example computer-implemented methods described herein.

In accordance with yet another aspect of the disclosure, a computer program product for arranging a plurality of data sequences is provided. The computer program product includes at least one non-transitory computer-readable storage medium having computer program code stored thereon. The computer program code, in execution with at least one processor, is configured to perform any one of the example computer-implemented methods described herein.

BRIEF DESCRIPTION OF THE DRAWINGS

Figure 1:
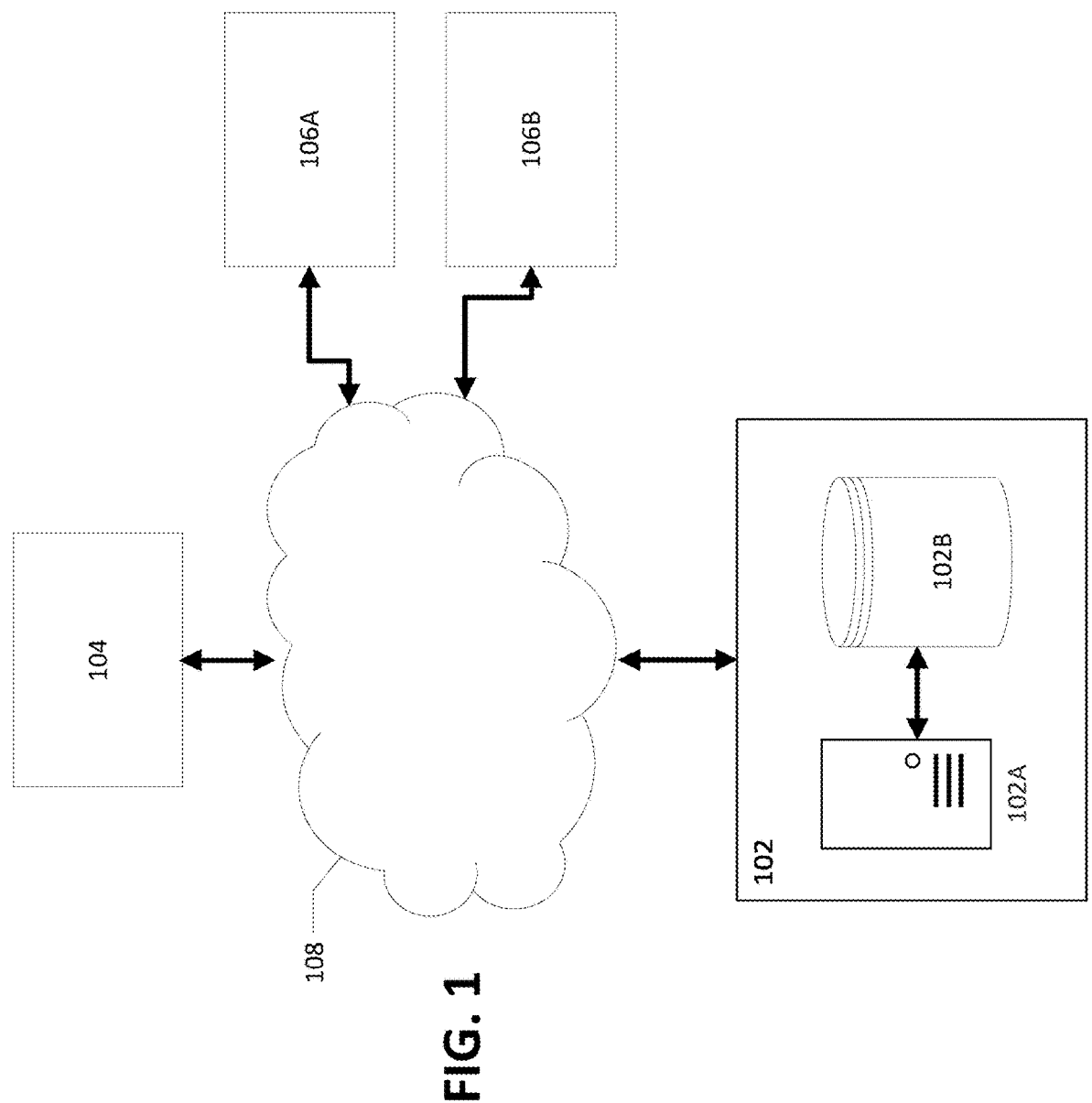
Figure 2:
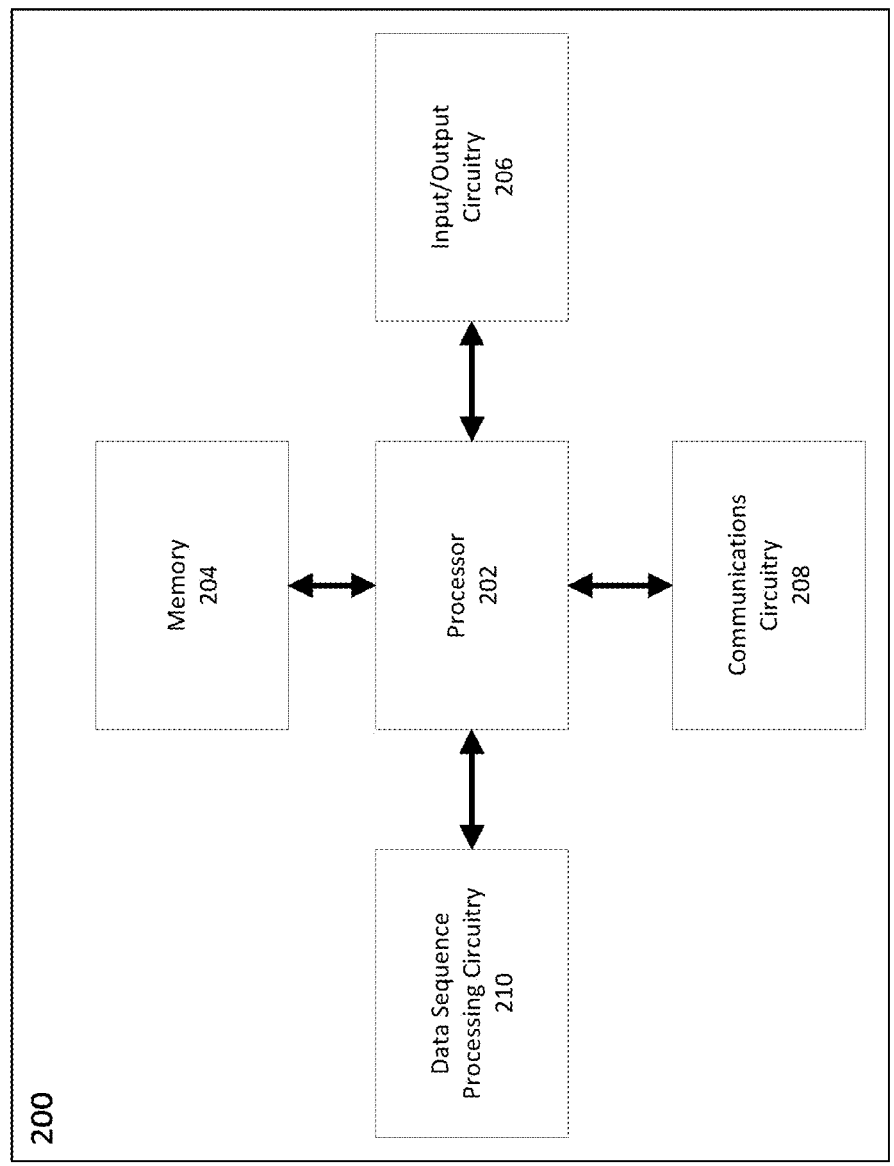
Figure 3:
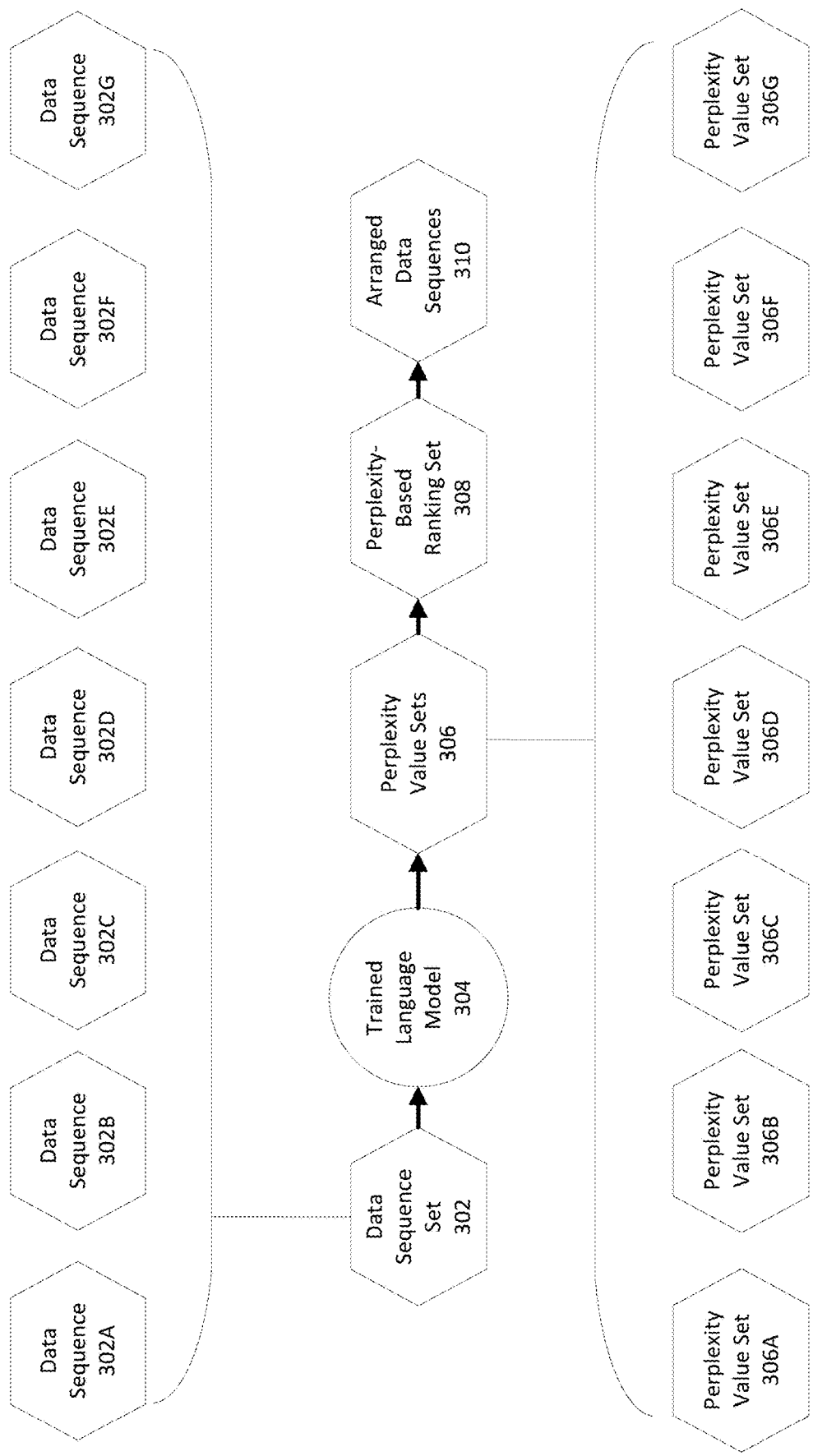
Figure 4:
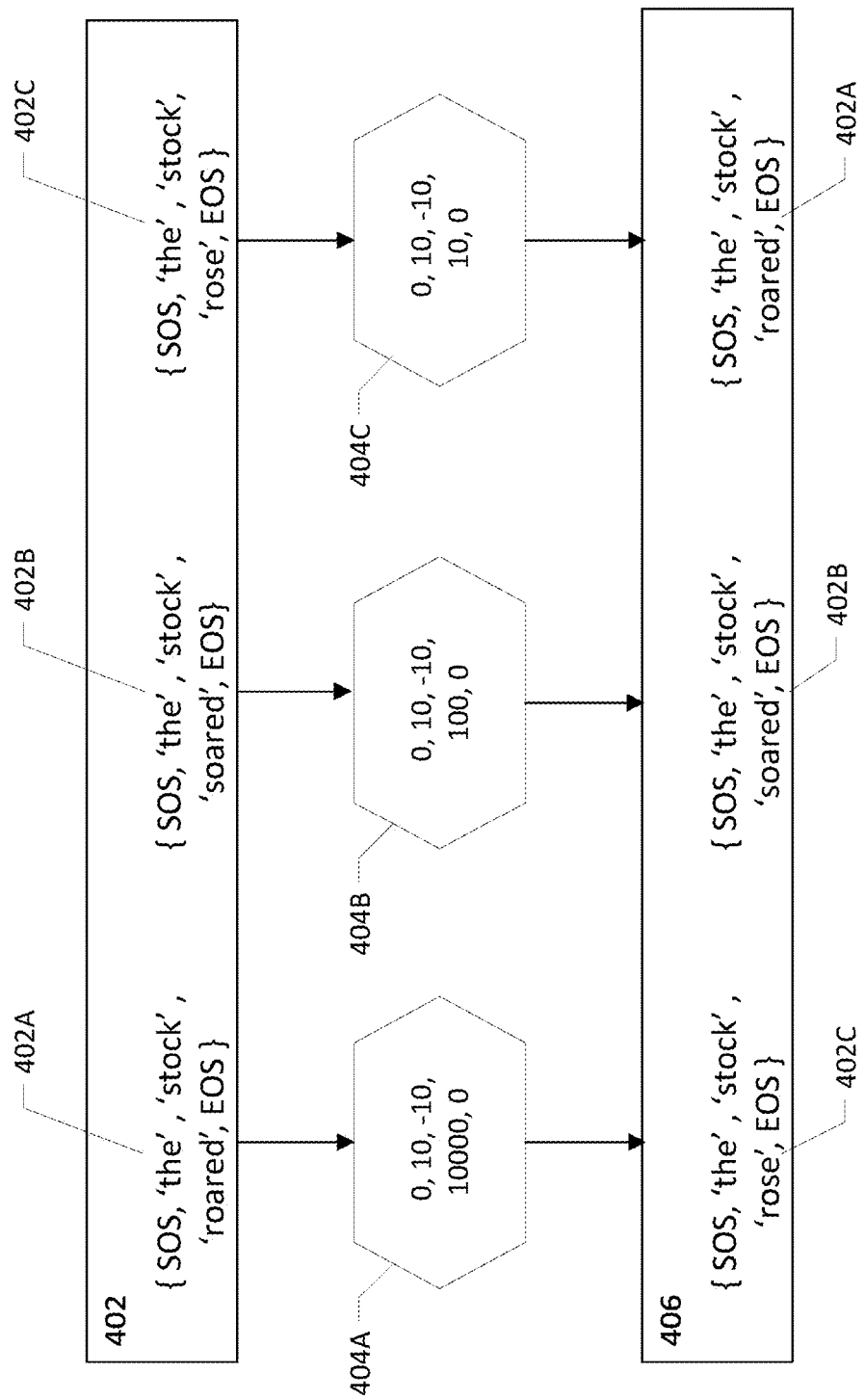
Figure 7:
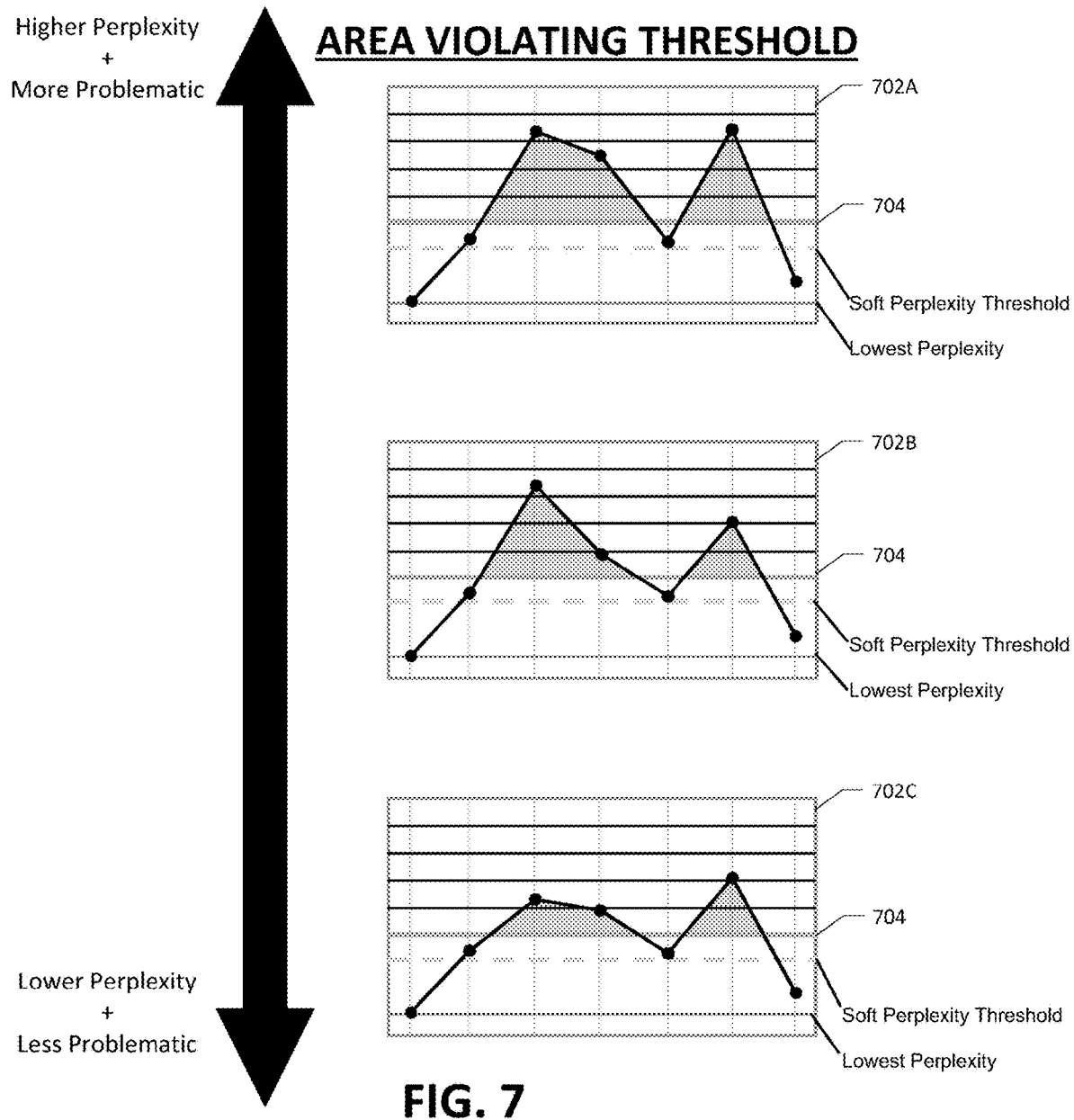
Figure 8C:
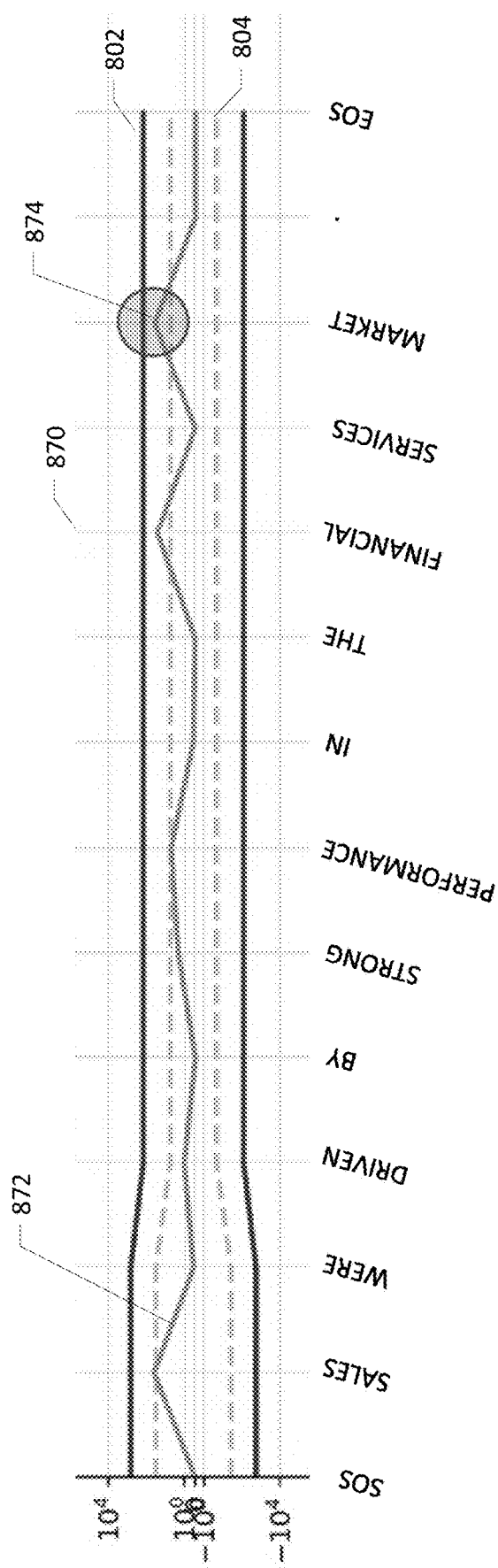
Figure 9:
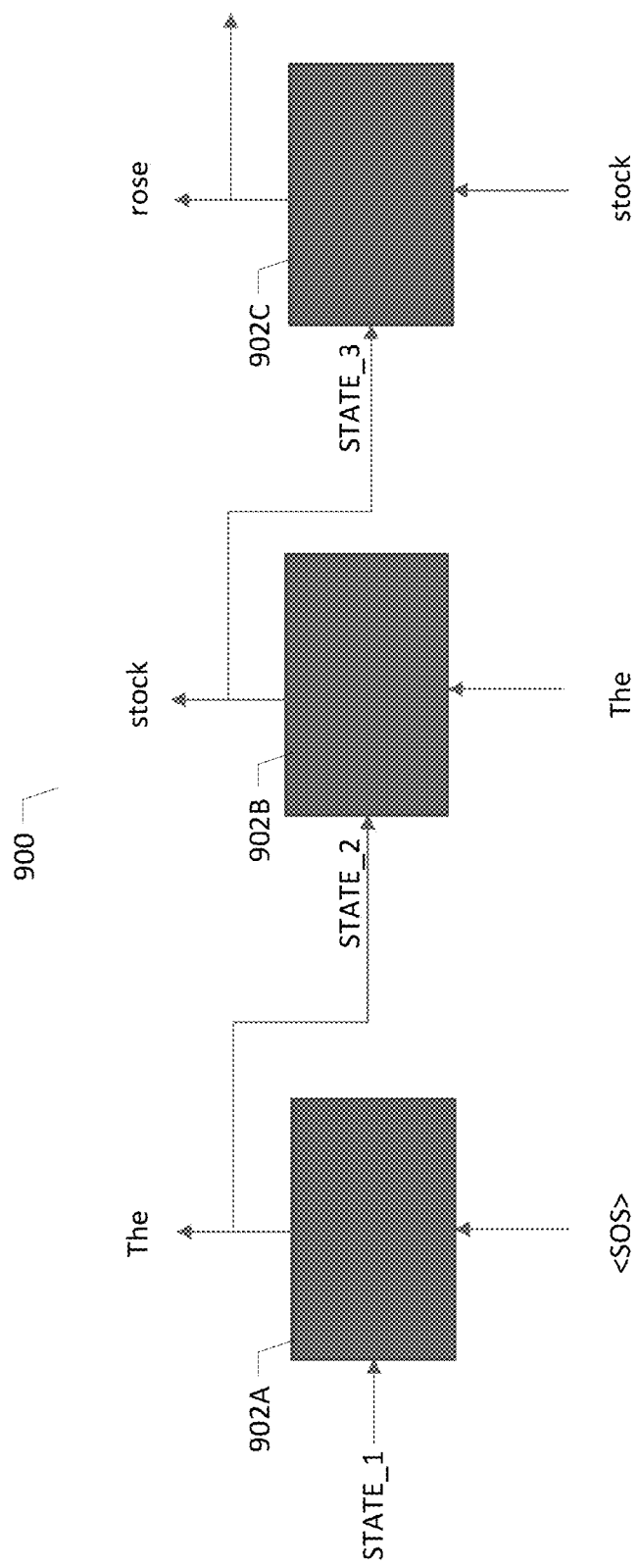
Figure 10:
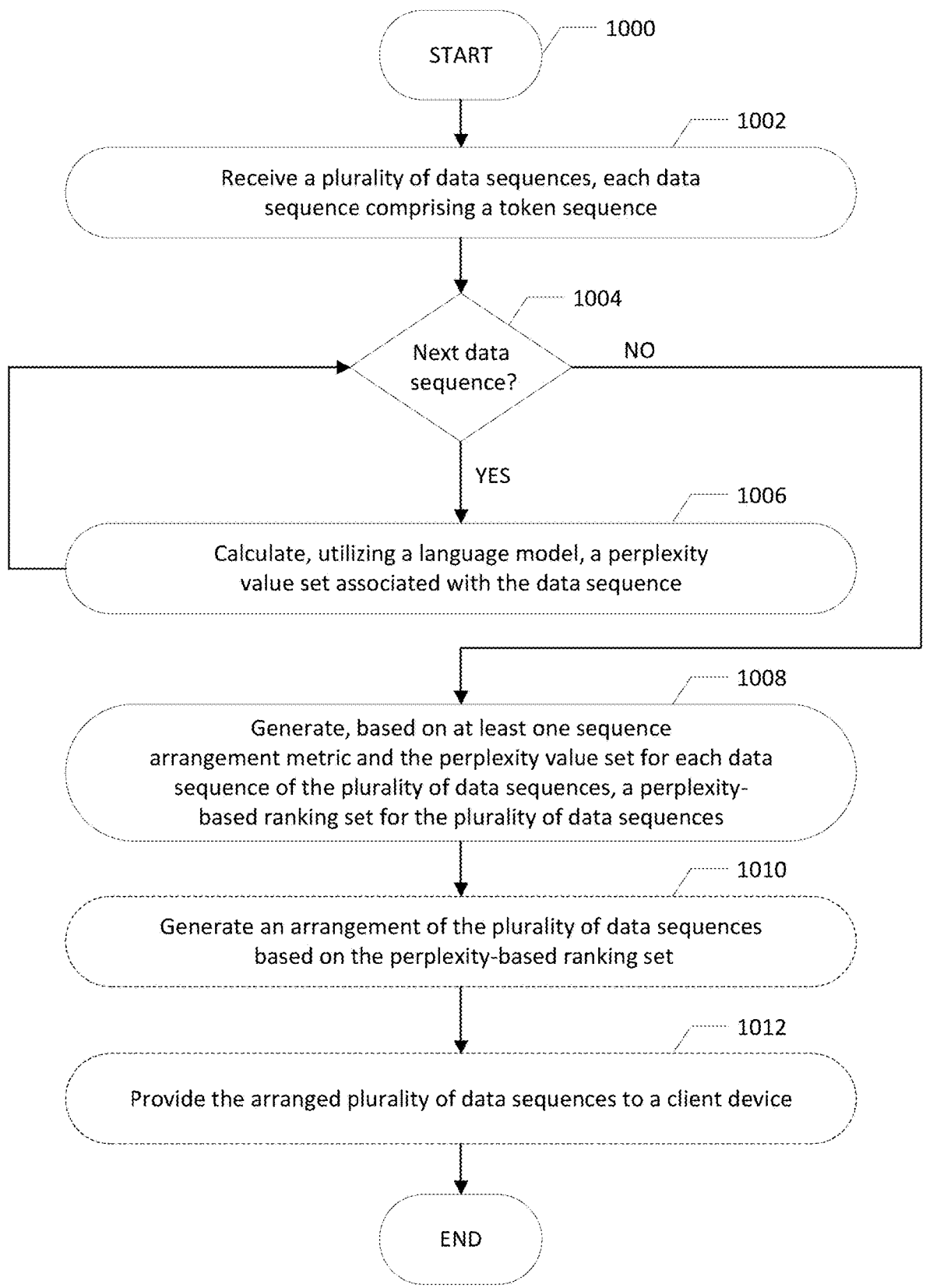
Figure 11:
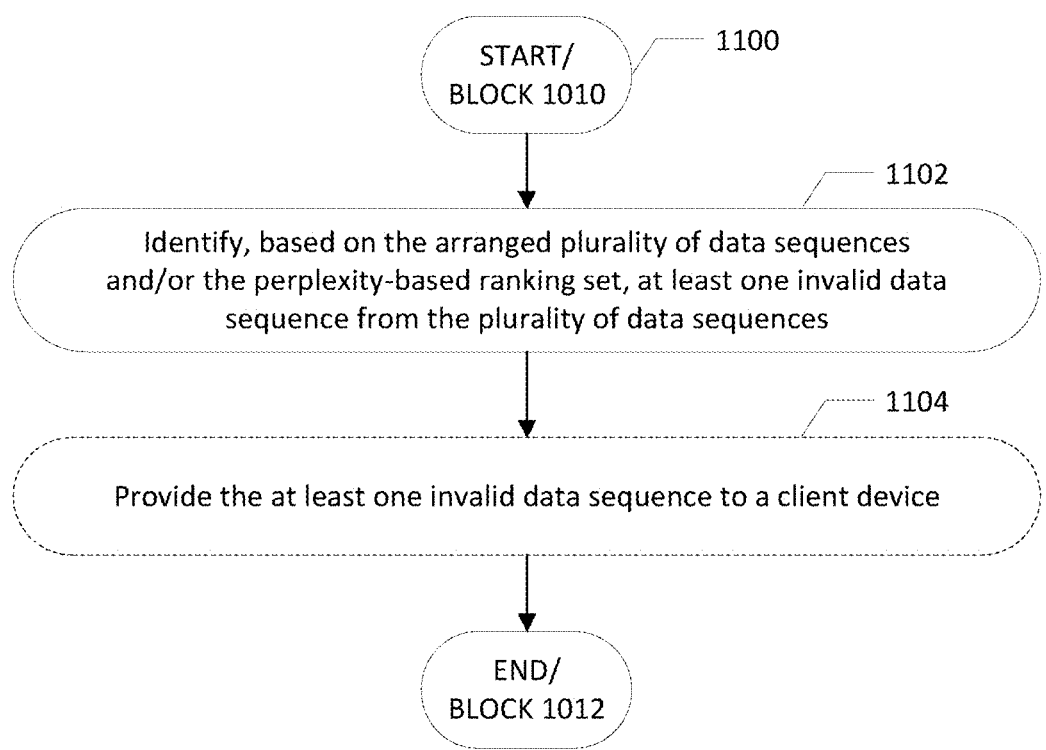
Figure 12:
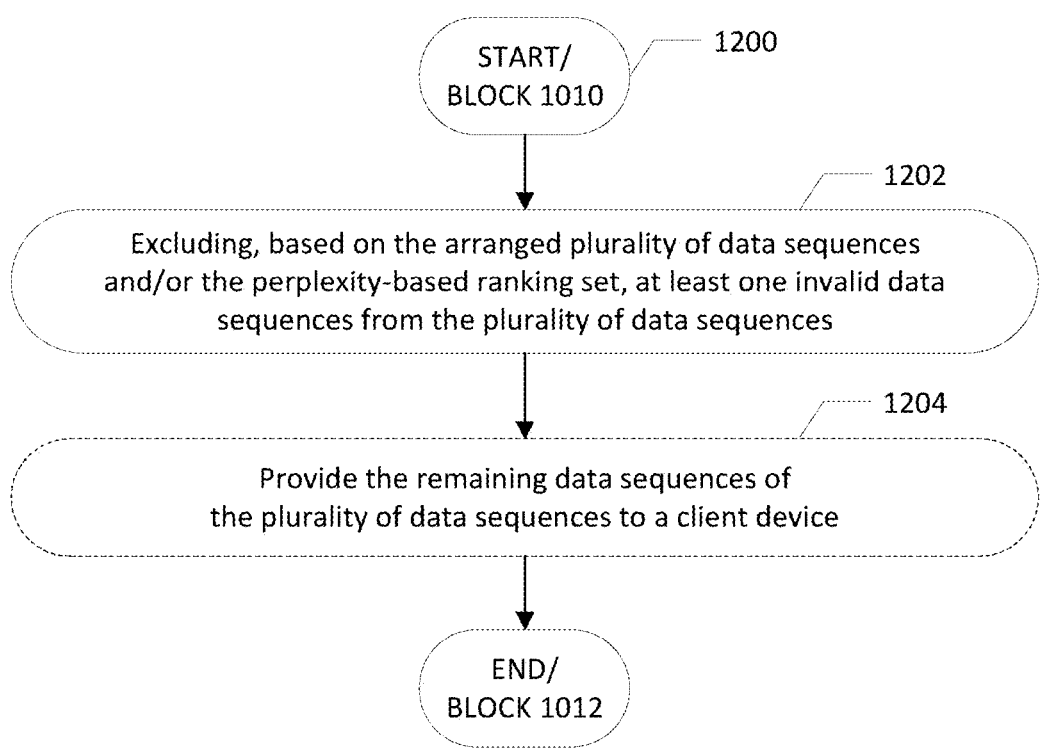
Figure 13:
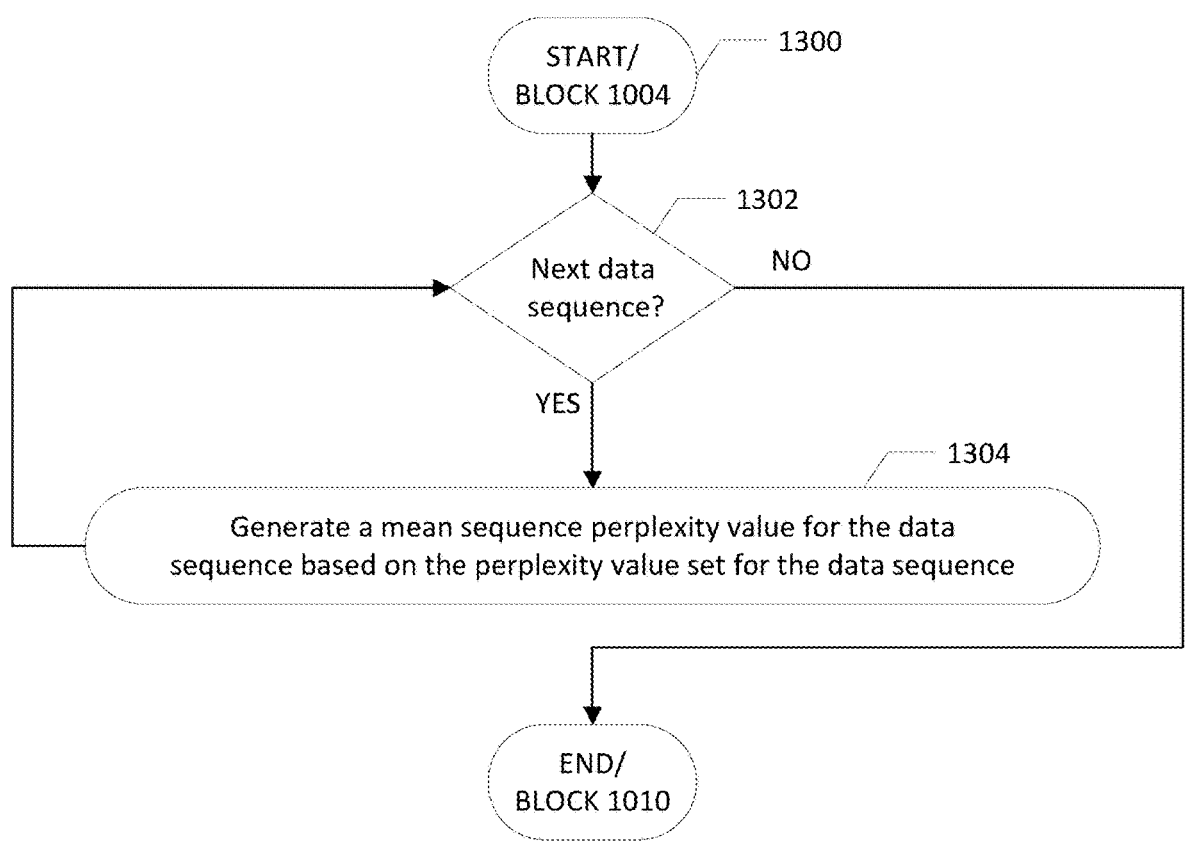
Figure 14:
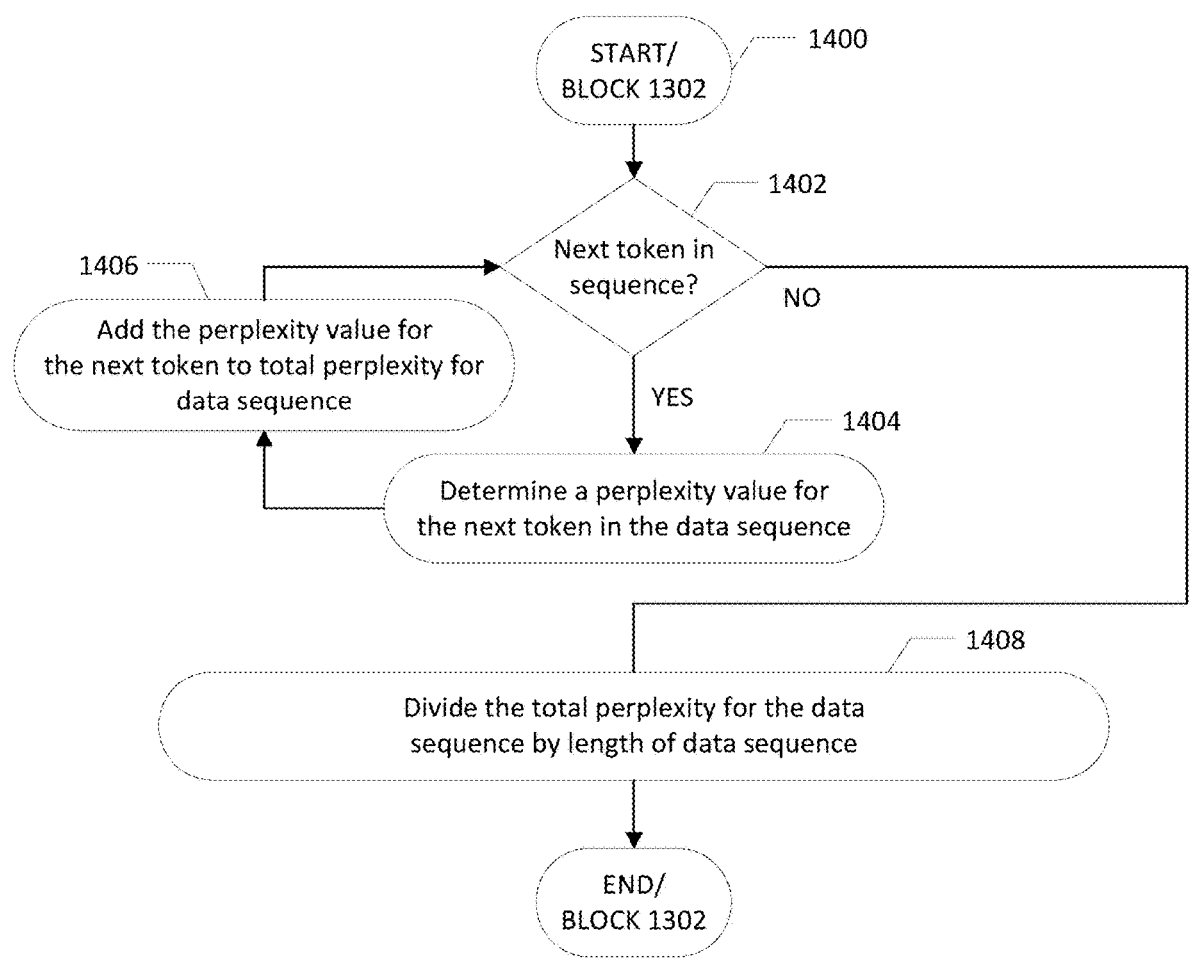
Figure 15:
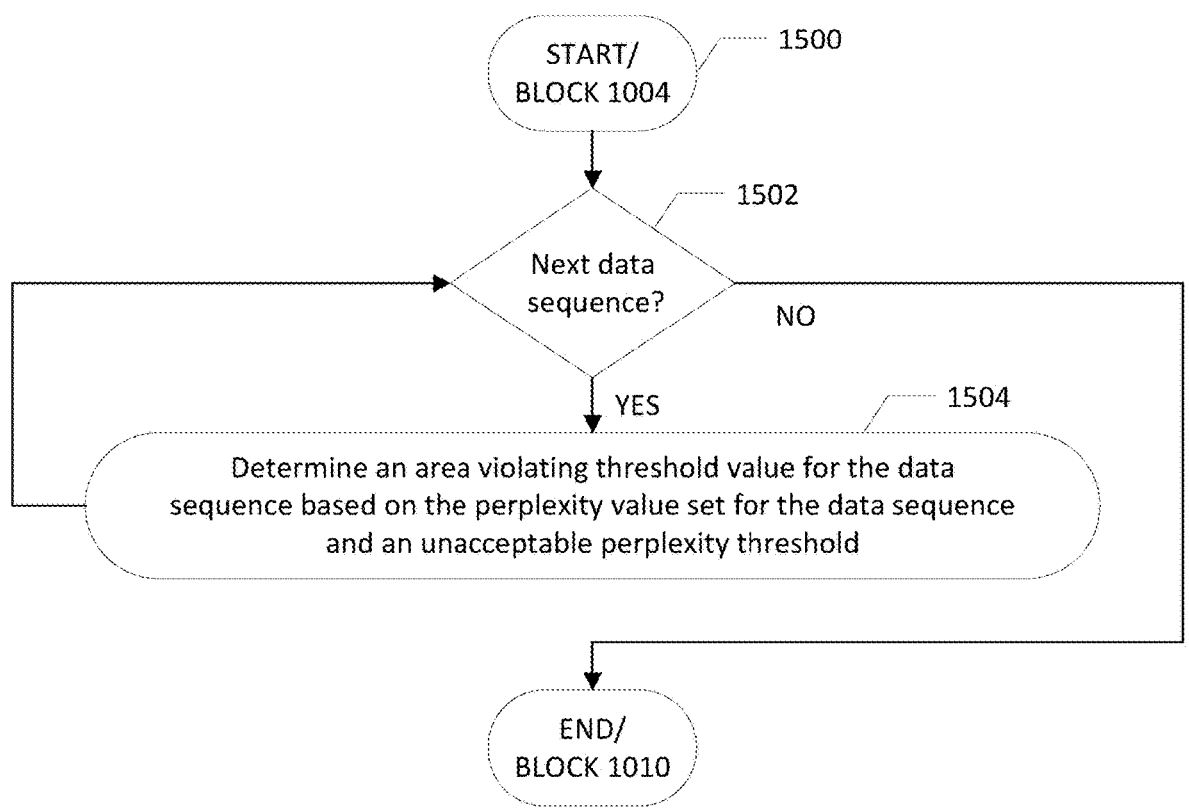
Figure 16:
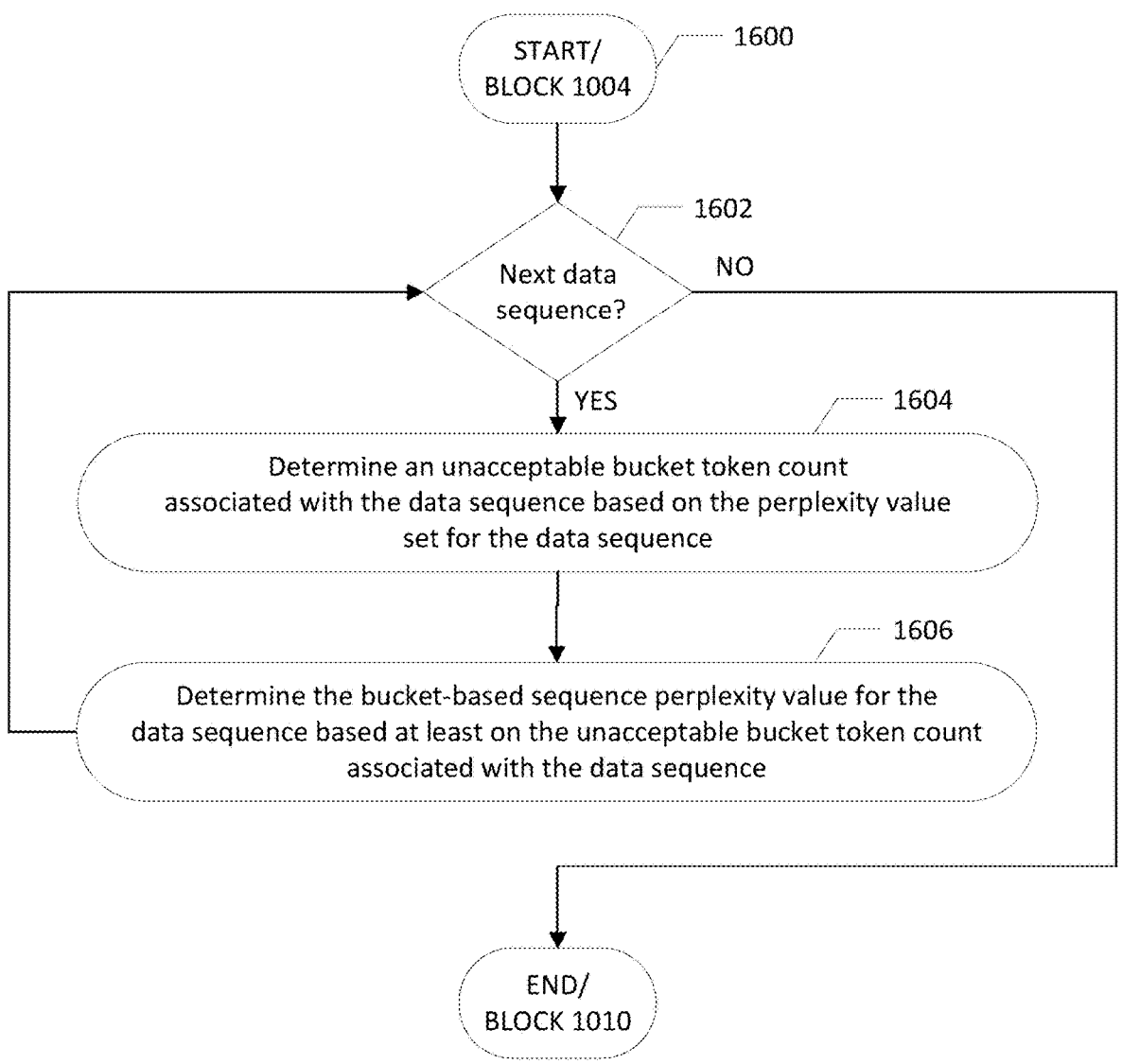

Having thus described the embodiments of the disclosure in general terms, reference now will be made to the accompanying drawings, which are not necessarily drawn to scale, and wherein:

FIG. 1 illustrates a block diagram of an example system for improved probabilistic data sequence validity processing within which embodiments of the present disclosure may operate;

FIG. 2 illustrates a block diagram of an example probabilistic data sequence validation apparatus that may be specially configured in accordance with at least some example embodiments of the present disclosure;

FIG. 3 illustrates a visualization of an example probabilistic data sequence validation computing environment maintained to perform probabilistic data sequence validation using perplexity in accordance with at least some example embodiments of the present disclosure;

FIG. 4 illustrates a simplified data example processed for probabilistic data sequence validation using perplexity in accordance with at least some example embodiments of the present disclosure;

FIG. 5 illustrates a graphical depiction of an example relationship between token perplexity values for example data sequences and data sequence validity using mean sequence perplexity values in accordance with at least some example embodiments of the present disclosure;

FIG. 6 illustrates a graphical depiction of an example relationship between token perplexity values for example data sequences and data sequence validity using bucket-based sequence perplexity values in accordance with at least some example embodiments of the present disclosure;

FIG. 7 illustrates a graphical depiction of an example relationship between token perplexity values for example data sequences and data sequence validity using area violating threshold values in accordance with at least some example embodiments of the present disclosure;

FIG. 8A illustrates a graphical depiction of a perplexity value set for a detailed example data sequence for a particular language domain in accordance with at least some example embodiments of the present disclosure;

FIG. 8B illustrates a graphical depiction of a perplexity value set for another detailed example data sequence for the particular language domain in accordance with at least some example embodiments of the present disclosure;

FIG. 8C illustrates a graphical depiction of a perplexity value set for a third detailed example data sequence for the particular language domain in accordance with at least some example embodiments of the present disclosure;

FIG. 9 illustrates operations of a language model for processing a particular example data sequence in accordance with at least some example embodiments of the present disclosure;

FIG. 10 illustrates a flowchart depicting example operations of an example process for data sequence validity processing in accordance with at least some example embodiments of the present disclosure;

FIG. 11 illustrates a flowchart depicting example operations of an example process for identifying invalid data sequences from a set of data sequences as part of data sequence validity processing in accordance with at least some example embodiments of the present disclosure;

FIG. 12 illustrates a flowchart depicting example operations of an example process for removing invalid data sequences from a set of data sequences as part of data sequence validity processing in accordance with at least some example embodiments of the present disclosure;

FIG. 13 illustrates a flowchart depicting example operations of an example process for generating a probabilistic ranking set based on mean perplexity values as part of data sequence validity processing in accordance with at least some example embodiments of the present disclosure;

FIG. 14 illustrates a flowchart depicting example operations of an example process for generating a mean perplexity value for a data sequence as part of data sequence validity processing in accordance with at least some example embodiments of the present disclosure;

FIG. 15 illustrates a flowchart depicting example operations of an example process for generating a probabilistic ranking set based on area violating threshold values as part of data sequence validity processing in accordance with at least some example embodiments of the present disclosure; and FIG. 16 illustrates a flowchart depicting example operations of an example process for generating a probabilistic ranking set based bucket-based sequence perplexity values as part of data sequence validity processing in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In several contexts, language processing systems benefit from processing language sequence(s) to determine which data sequences are likely to belong in a language, certain domain, and/or are otherwise valid within one or more context(s). The resulting determinations are integrated into several computing systems, for example computing systems configured to detect invalid data sequences, identify fraudulent data sequences, and/or otherwise manipulate a set of input data sequences based on the determinations. In one such example context, for example where a data sequence embodies a sentence, the accuracy of such determinations is important to accurately suppressing invalid sentences in a data stream, eliminating bad text from a data stream, and/or otherwise identifying incorrect sentences in a data stream. In this regard, language processing systems that perform such data sequence processing in a manner that is efficient and remains accurate are desired.

Embodiments of the present disclosure provide for improved processing of data sequences in a manner that is both accurate and efficient. In some embodiments, a set of data sequences is input to a language model that outputs a probability values associated with the tokens of each data sequence. In some embodiments, for example, a perplexity value set associated with the token sequence of each data sequence may be outputted as one example, whereas in other embodiments other probabilities and/or metrics derived from probability may be outputted. The perplexity value set (or other probability value set) is utilized to generate a corresponding probabilistic ranking set, for example based on any of a myriad of sequence arrangement metric(s). The probabilistic ranking set is subsequently utilizable to arrange and/or otherwise determine an arranged set of the set of data sequences.

Embodiments of the present disclosure provide probabilistic data sequence processing for such data generation and/or corresponding determinations and/or actions in a manner that provides various technical improvements over conventional implementations for identifying invalid data sequences. For example, in at least some embodiments, utilization of a language model to determine perplexity and subsequent ranking based on the perplexity enables data sequence ranking and/or arrangement in a manner that is both more accurate and efficient than conventional implementations. Upon providing such accurate data sequence ranking(s) and/or arrangements, at least some embodiments are configured to enable use of such ranking(s) and/or arrangement in any of a myriad of subsequent use cases, such as to provide such data to a user, further process such data, remove and/or otherwise manipulate the set of data sequence(s) based on such data, and/or the like. Additionally or alternatively, at least some embodiments utilize a language model that reduces the complexity of implementations for data sequence processing without negatively impacting efficiency and/or accuracy. Additionally or alternatively, embodiments utilize processing components and models not limited to any particular order of data sequences and/or language of data sequences.

In this regard, the embodiments described herein provide various improvements to the technical field of data sequence processing. Specifically, embodiments of the present disclosure provide for generation of arrangements of data sequences that identify the data sequences most likely to be invalid. Additionally or alternatively, embodiments of the present disclosure provide for improved identification of invalid data sequences. Additionally or alternatively still, embodiments of the present disclosure provide for manipulation of one or more data sequences in a set of data sequences to change such data sequences from invalid data sequence(s) to valid data sequence(s) by manipulating one or more token(s) of such data sequence(s). Additionally, embodiments of the present disclosure provide improved efficiency, improved accuracy, and improved user experience(s) for processing data associated with such data sequence(s). Conventional systems fail to address the identified technical problems and fail to provide the identified technical improvements.

It should be appreciated that certain embodiments are described herein with respect to particular probability-based metrics, for example perplexity values. Such probability-based metrics embody an example probability value that may be generated and/or processed associated with individual tokens and/or data sequences. Perplexity is provided as an example context for purposes of simplifying the disclosure and providing specific examples to provide an enhanced understanding of the described innovations. In this regard, it should be appreciated that embodiments in accordance with this disclosure is not limited to perplexity values and that, in other embodiments, other probability values may similarly be utilized and/or values derived from probability may similarly be utilized. Description and/or examples utilizing perplexity values should not limit the scope or spirit of this disclosure.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "client device" one or more computing devices embodied in hardware, software, firmware, and/or a combination thereof, that is controlled by a user for communication with and/or access of functionality provided by a data sequence processing system. Non-limiting examples of a client device include a user device executing one or more software applications, for example without limitation a mobile device, a smartphone, a tablet, a personal computer, a laptop, a wearable, an Internet-of-Things enabled device, a smart home device, and a voice-enabled digital assistant.

The term "data sequence processing system" refers to one or more computing devices embodied in hardware, software, firmware, and/or a combination thereof, that provides data sequence processing functionality. In some embodiments, a data sequence processing system is embodied by one or more server(s) and/or database(s) in communication with at least a client device accessing functionality provided by the data sequence processing system.

The term "token" refers to a string of characters (e.g., word, set of words (e.g., a phrase)), or character, within a larger data set. The term "token sequence" refers to zero or more tokens defining a larger data set. Non-limiting examples of a token sequence include a word comprising various characters, a phrase comprising various words, a sentence comprising various words, a paragraph comprising various words and/or various sentences, a chapter comprising various sentences and/or paragraphs, and the like. The term "token sequence" refers to one or more data objects embodying any number of tokens in a particularly defined order. A particular token in a token sequence is associated with a prior context defined by any number of tokens preceding the particular token in the token sequence, and a subsequent context defined by any number of tokens subsequent to the particular token in the token sequence.

The term "data sequence" refers to a sequence of language embodied by a token sequence arranged in a defined sequential order. Non-limiting examples of a data sequence include a word, a phrase, a sentence, a paragraph, a chapter, and the like.

The term "language model" refers to a statistical, algorithmic, and/or machine learning model trained to generate probabilities for tokens in a data sequence given the context surrounding the token based on the remaining tokens. For example, in some embodiments, a language model refers to a trained machine learning model that produces a probability associated with a particular token based on the sequence of tokens preceding the token in a data sequence. In this regard, it should be appreciated that the probability generated for a particular token in some embodiments represents an expectation that the token follows the preceding tokens in the data sequence.

The term "language training data" refers to any combination of language-based data objects and/or tokens embodying electronically managed text that is utilized to train a language model. In some embodiments, as a non-limiting example, language training data refers to a sequence of tokens representing words, phrases, sentences, paragraphs, and/or larger structured text content (e.g., web pages or other electronic documents).

The term "domain-specific set of language training data" refers to a subset of language training data that is correlated to one another based on a shared contextual classification. A domain-specific set of language training data is generatable based on any desired level of granularity. Non-limiting examples of a domain-specific set of language training data include financial articles, product reviews, movie plot text, and the like.

The term "perplexity value" refers to an electronically managed data value that represents a fit of how well a probability distribution, and/or probability model, embodied by a language model predicts a particular token in a data sequence. In some embodiments, the perplexity value for a given token represents the probability that the token follows a particular preceding context defined by a sequence of preceding tokens in the data sequence. The term "perplexity value set" with respect to all tokens of a data sequence refers to any number of data objects representing zero or more perplexity values, for example any number of data objects representing the perplexity value for each token in a data sequence.

The term "probabilistic ranking" refers to an electronically managed data value representing the determined likelihood that a data sequence is valid as compared to zero or more other data sequences. The term "probabilistic ranking set" refers to any number of data objects representing zero or more probabilistic rankings, for example any number of data objects representing each probabilistic ranking for each data sequences in a plurality of data sequences.

The term "sequence arrangement metric" refers to a determinable electronically managed data value for use in generating a probabilistic ranking associated with one or more data sequences. Any algorithmic process that utilizes perplexity values of one or more tokens in a data sequence may be utilized to generate a sequence arrangement metric. Non-limiting examples of a sequence arrangement metric include an average sequence perplexity value, an area violating threshold value, and a bucket-based sequence perplexity values.

The term "mean sequence perplexity value" refers to an electronically managed data value representing a calculated mean of all perplexity value(s) for a particular token sequence, for example embodying a particular data sequence. The term "mean sequence perplexity value set" refers to any number of data objects representing zero or more mean sequence perplexity values, for example any number of data objects representing mean sequence perplexity value for each data sequence of a plurality of data sequences.

The terms "soft perplexity threshold" and "model soft perplexity threshold" refer to electronically managed data value(s) that represent a limit of perplexity value within which a token or data sequence is indicated as unsurprising with respect to a baseline perplexity for a given language model. In some embodiments, the soft perplexity threshold for a language model is determined based on the average perplexity generated by a language model for a particular corpus during testing and/or training of the language model.

The term "unacceptable perplexity threshold" refers to electronically managed data value(s) that represent a limit of perplexity value within which a token or data sequence is indicated as likely valid. In some embodiments, an unacceptable perplexity threshold is set by a user. In other embodiments, an unacceptable perplexity threshold is automatically determined by a system, such as a data sequence processing system.

The term "area violating threshold value" refers to an electronically managed data value representing, for a particular data sequence, a calculated area above an unacceptable perplexity threshold, as defined by each perplexity value in a perplexity value set corresponding to a token sequence and the corresponding unacceptable perplexity threshold. The term "area violating threshold value set" refers to any number of data objects representing zero or more area violating threshold values, for example any number of data objects representing the unacceptable perplexity threshold values for each data sequence of a plurality of data sequences.

The term "unacceptable bucket" refers to one or more electronically managed data values representing a range of perplexity values that are determined and/or indicated by a user as indicating a token is likely invalid in a circumstance where a perplexity value for the token falls within the range. In some embodiments, each unacceptable bucket is associated with a different weight indicating a level of likely invalidity of a token having a perplexity value falling within the range defining the unacceptable bucket.

The term "bucket-based sequence perplexity value" refers to an electronically managed data value representing a determined representation of perplexity for a particular data sequence based on the number of perplexity values for tokens embodying the data sequence that fall within each of various unacceptable buckets. The term "bucket-based sequence perplexity values set" refers to any number of data objects representing zero or more bucket-based sequence perplexity values, for example any number of data objects representing bucket-based sequence perplexity values for each data sequence of a plurality of data sequences.

The term "unacceptable bucket token count" with respect to a data sequence refers to an electronically managed data value representing a number of perplexity values for a token sequence that fall within a range defined by a particular unacceptable bucket.

The term "arrangement of data sequences" refers to one or more data objects structured to embody an ordered set of data sequences based on the probabilistic rankings for the data sequences. Non-limited examples of an arrangement of data sequences include an ordered data object structured to include the data sequences in an order from highest probabilistic ranking to lowest probabilistic ranking (or from lowest probabilistic ranking to highest probabilistic ranking), including without limitation an ordered list, a linked list, a sorted array or vector, and/or other sorted data structure.

The term "invalid data sequence" refers to a data sequence determined as likely to not fall within a particular language domain. In some embodiments, an invalid data sequence is determined based on a probabilistic ranking for the data sequence and/or a probabilistic ranking set for a plurality of data sequences, one or more perplexity value(s) for a token sequence embodying the data sequence, and/or a combination thereof. In an example context of data sequences embodying sentences, for example, an invalid data sequence represents a sentence determined from a set of sentences as unlikely to be a sensible sentence within a particular language domain.

The term "perplexity offset" refers to an electronically managed data value representing a determinable offset for a token perplexity value corresponding to a token at a data sequence having insufficient context data preceding the token (e.g., insufficient token(s) prior to the token being processed) and/or succeeding the token being processed (e.g., after token(s) following the token being processed). In some embodiments, the perplexity offset is predetermined, set by a particular system determination, and/or user-configurable.

Example Systems of the Disclosure

FIG. 1 illustrates a block diagram of an example system for improved probabilistic data sequence validity processing within which embodiments of the present disclosure may operate. Specifically, as illustrated, the example system includes a probabilistic data sequence validation system 102, a client device 104, an external data sequence storage system 106A, and an external data sequence storage system 106B (collectively "external data sequence storage systems 106"). The system further includes a communications network 108 that enables communication between one or more of the probabilistic data sequence validation system 102, client device 104, and external data sequence storage systems 106. For example, in some embodiments, the communications network 108 facilitates communication between the probabilistic data sequence validation system 102 and the client device 104, and between the probabilistic data sequence validation system 102 and each of the external data sequence storage systems 106.

The probabilistic data sequence validation system 102 includes one or more server(s) 102A and/or one or more datastore(s) 102B. In some embodiments, the server(s) 102A and the datastore(s) are communicable with one another to provide any of the functionality described herein. For example, in some embodiments, the server(s) 102A are connected to the datastore(s) 102B via one or more wire(s), bus(es), and/or other communication lines to enable communication with the datastore(s) 102B. Alternatively or additionally, in some embodiments, the server(s) 102A are communicable with the datastore(s) 102B over a wireless connection, for example over the communications network 108 and/or an alternative network (e.g., a private network and/or internal communications network specific to the probabilistic data sequence validation system 102.

The server(s) 102A include any number of computing devices that facilitate particular application(s), process(es), and/or the like for probabilistic data sequence validity processing. It should be appreciated that in some embodiments, the server(s) 102A include only a single server configured to perform the functionality described herein, and in other embodiments the server(s) 102A includes a plurality of server(s) configured to operate in conjunction with one another to perform the functionality described herein. For example, in some embodiments, the server(s) 102A include any number of application servers that, alone or in cooperation with one another, facilitate the probabilistic data sequence processing described herein. The server(s) 102A are specially configured to execute one or more software application(s), process(es), and/or the like, that provide the probabilistic data sequence processing functionality described herein. In some embodiments, the server(s) 102A include one or more cloud server(s) located remotely from a primary location associated with other server(s) of the probabilistic data sequence validation system 102 and/or the datastore(s) 102B. For example, the primary location may be owned and/or operated by an entity in control of the probabilistic data sequence validation system 102, for example a business entity, an individual owner, and/or the like.

The datastore(s) 102B include any number of computing devices that facilitate storage, maintenance, and/or retrieval of data object(s) for processing. It should be appreciated that, in some embodiments, the datastore(S) 102B include only a single datastore configured to perform the functionality described herein, and in other embodiments the datastore(s) 102B includes a plurality of datastore(s) configured to operate in conjunction with one another to perform the functionality described herein. In some embodiments, the datastore(s) 102B include one or more database(s), sub-database(s), table(s), and/or the like, configured for storing data received by, generated by, and/or otherwise processed by the server(s) 102A. In this regard, each of the servers 102A may read data from and/or write data to some or all of the server(s) 102B. Such data may include, without limitation, data sequence(s) for training a language model and/or processing via a language model, user account(s) associated with users having access to some or all functionality provided by the probabilistic data sequence validation system 102. In some embodiments, the datastore(s) 102B includes one or more remote and/or "cloud" repositories located remote from a primary location associated with the probabilistic data sequence validation system 102.

Each of the external data sequence storage systems 106 include any number of computing device(s) configured to receive, collect, and/or store a set of data sequences. In some embodiments, for example, the external data sequence storage system 106A aggregates data sequences embodying text from particular websites, press releases, and/or the like. The external data sequence storage system 106B, for example, facilitates a web-hosted application that includes a plurality of data sequences, such as a blog website, a news website, or an encyclopedia and/or information aggregation web site. The plurality of data sequences, for example, embody paragraphs, sentences, and/or other language sub-structures that embody text information to be provided by the external data sequence storage system 106B as part of providing functionality associated with or utilizing the data sequence(s). In this regard, the probabilistic data sequence validation system 102 may retrieve, collect, and/or otherwise receive the data sequences from one or more of the external data sequence storage systems 106 for processing.

The client device 104 includes any number of user-facing computing device(s) that enable access to the probabilistic data sequence validation system 102. For example, in some embodiments, the client device 104 includes a user device owned and/or operated by a user for accessing the probabilistic data sequence validation system 102 over the communications network 108. In this regard, the client device 104 may execute and/or otherwise provide a client-facing application (e.g., a user-facing "app" and/or a web-application executing on the client device 104) utilized to request and/or otherwise access functionality provided from the probabilistic data sequence validation system 102. Alternatively or additionally, in some embodiments, the client device 104 is embodied by and/or otherwise included in the probabilistic data sequence validation system 102. For example, the client device 104 may be embodied by an enterprise terminal that is configured to receive user input and/or provide output visible to a user of the enterprise terminal.

Example Apparatuses of the Disclosure

Having discussed example systems in accordance with the present disclosure, example apparatuses in accordance with the present disclosure will now be described. In some embodiments, the probabilistic data sequence validation system 102 as described herein with respect to FIG. 1 is embodied by one or more computing systems. For example, in at least one embodiment, the probabilistic data sequence validation system 102 is embodied by the probabilistic data sequence validation apparatus 200 as depicted and described in FIG. 2. The probabilistic data sequence validation apparatus 200 includes a processor 202, a memory 204, input/output circuitry 206, communications circuitry 208, and/or data sequence processing circuitry 210. The probabilistic data sequence validation apparatus 200 is configured, utilizing one or more of the sets of circuitry 202, 204, 206, 208, and/or 210, to execute any one or more of the operations described herein.

Although components are described with respect to functional limitations, it should be understood that the particular implementations necessarily include the use of particular computing hardware. It should also be understood that certain of the circuitry described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the probabilistic data sequence validation apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the probabilistic data sequence validation apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the probabilistic data sequence validation apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the probabilistic data sequence validation apparatus 200, and/or one or more remote or "cloud" processor(s) external to the probabilistic data sequence validation apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations embodying probabilistic data sequence processing functionality. In this regard, the processor 202 in some embodiments is configured to perform and/or otherwise support the various functionality performed by the probabilistic data sequence validation system 102, as described herein. In some embodiments, the processor 202 includes hardware, software, firmware, and/or a combination thereof, that receives and/or otherwise identifies a set of data sequences. Additionally or alternatively, in some embodiments, the processor 202 includes hardware, software, firmware, and/or a combination thereof, that calculates, utilizing a language model, a perplexity value set for each data sequence in the set of data sequences. Additionally or alternatively, in some embodiments, the processor 202 includes hardware, software, firmware, and/or a combination thereof, that generate a probabilistic ranking set associated with the set of data sequences based on at least one sequence arrangement metric and the perplexity value sets. Additionally or alternatively, in some embodiments, the processor 202 includes hardware, software, firmware, and/or a combination thereof, that arranges n arrangement of the plurality of data sequences based on the probabilistic ranking set. Additionally or alternatively, in some embodiments, the processor 202 includes hardware, software, firmware, and/or a combination thereof, that performs various determinations and/or actions based on the arrangement of the set of data sequences and/or probabilistic ranking set for the set of data sequences. In some embodiments, the processor 202 performs one or more of such actions in combination with another set of circuitry of the probabilistic data sequence validation apparatus 200.

The input/output circuitry 206 provides output to the user and, in some embodiments, receives one or more indication(s) of user input. In some embodiments, the input/output circuitry 206 is in communication with processor 202 to provide such functionality. The input/output circuitry 206 includes one or more user interface(s) and/or includes a display that may comprise the user interface(s) rendered as a web user interface, an application interface, and/or the like, to the display of a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising or otherwise interacting with the processor 202 may be configured to control one or more functions of one or more user interface elements through computer program instructions (e.g., software and/or firmware) stored on a memory accessible to the processor 202 (e.g., stored on memory 204, and/or the like).

The communications circuitry 208 includes any device, circuitry, and/or other means embodied in hardware, software, firmware, and/or a combination of hardware, software, and software, that is configured to receive and/or transmit data from/to a network and/or any other device, circuitry, or module of or in communication with probabilistic data sequence validation apparatus 200. In this regard, the communications circuitry 208 may include, for example, a network interface for enabling communications with a wired or wireless communication network. For example, the communications circuitry 208 in some embodiments includes one or more network interface card(s), antenna(s), bus(es), switch(es), router(s), modem(s), and supporting hardware and/or software, or any other device suitable for enabling communications via one or more communication network(s). Additionally or alternatively, in some embodiments the communications circuitry 208 includes circuitry for interacting with the antenna(s) and/or other hardware or software to cause transmission of signals via the antenna(s) or to handle receipt of signals received via the antenna(s).

The data sequence processing circuitry 210 includes hardware, software, firmware, and/or a combination thereof, configured to support various aspects of probabilistic data sequence validation functionality as described herein. In some embodiments, the data sequence processing circuitry 210 utilizes processing circuitry, such as the processor 202 and/or the like, to perform one or more of such actions. Additionally or alternatively, in some embodiments, data sequence processing circuitry 210 utilizes input/output circuitry 206 to facilitate user output (e.g., causing rendering of one or more user interface(s)), and/or to receive user input (e.g., user clicks, user taps, keyboard interactions, user gesture, and/or the like). Additionally or alternatively still, in some embodiments, the data sequence processing circuitry 210 utilizes communications circuitry 208 to initiate transmissions to another computing device, receive transmissions from another computing device, communicate signals between the various sets of circuitry as depicted, and/or the like.

In some embodiments, the data sequence processing circuitry 210 includes hardware, software, firmware, and/or a combination thereof, that receives a set of data sequences for processing. Alternatively or additionally, in some embodiments, the data sequence processing circuitry 210 includes hardware, software, firmware, and/or a combination thereof, that calculates, utilizing a language model, a perplexity value set associated with a particular data sequence. In some embodiments, the data sequence processing circuitry 210 calculates the perplexity value set associated with a data sequence based on each token of the data sequence. Additionally or alternatively, in some embodiments, the data sequence processing circuitry 210 includes hardware, software, firmware, and/or a combination thereof, that generates a probabilistic ranking set for the plurality of data sequences, based on at least one sequence arrangement metric and the perplexity value set for each data sequence. Additionally or alternatively, in some embodiments, the data sequence processing circuitry 210 includes hardware, software, firmware, and/or a combination thereof, that arranges an arrangement of the set of data sequences based on the probabilistic rankings. Additionally or alternatively, in some embodiments, the data sequence processing circuitry 210 includes hardware, software, firmware, and/or a combination thereof, that provides the arrangement of the plurality of data sequences to a user, for example via a client device for presenting.

Additionally or alternatively, in some embodiments, the data sequence processing circuitry 210 includes hardware, software, firmware, and/or a combination thereof, that identifies at least one invalid data sequence from the set of data sequences, and/or at least one valid data sequence from the set of data sequences. Additionally or alternatively, in some embodiments, the data sequence processing circuitry 210 includes hardware, software, firmware, and/or a combination thereof, that excludes, deletes, and/or otherwise removes at least one data sequence from the set of data sequences based on the arrangement of the set of data sequences. Additionally or alternatively, in some embodiments, the data sequence processing circuitry 210 includes hardware, software, firmware, and/or a combination thereof, that generates an average sequence perplexity value set for the set of data sequences, an area violating threshold value set for the set of data sequences, and/or a bucket-based sequence perplexity values set for the set of data sequences. Additionally or alternatively, in some embodiments, the data sequence processing circuitry 210 includes hardware, software, firmware, and/or a combination thereof, that causes rendering of any of a myriad of user interfaces including the generated and/or otherwise determined data. It should be appreciated that, in some embodiments, the data sequence processing circuitry 210 may include a separate processor, specially configured field programmable gate array (FPGA), or a specially programmed application specific integrated circuit (ASIC), to perform such functionality.

It should be appreciated that, in some embodiments, one or more of the sets of circuitry 202-210 are combinable. Alternatively or additionally, in some embodiments, one or more of the sets of circuitry performs some or all of the functionality described associated with another set of circuitry. For example, in some embodiments, the data sequence processing circuitry 210 is combined with the processor 202, such that the processor 202 performs one or more of the operations described above with respect to the data sequence processing circuitry 210.

Example Computing Environment and Data of the Disclosure

Having discussed example apparatuses and systems of the disclosure, example computing environments and data processed therein will now be discussed. In this regard, the computing environments and/or individual data objects in some embodiments are maintained via one or more software applications executed on specially configured computing devices as described herein. For example, in some embodiments, the computing environments and/or data objects embodied therein are maintained by one or more computing programs executed by a specially configured probabilistic data sequence validation system 102 embodied by the probabilistic data sequence validation apparatus 200.

FIG. 3 illustrates a visualization of an example probabilistic data sequence validation computing environment maintained to perform probabilistic data sequence validation using perplexity in accordance with at least some example embodiments of the present disclosure. Specifically, as illustrated, the computing environment includes a plurality of data objects processed for probabilistic data sequence validation. In this regard, the computing environment may embody one or more software process(es) that manipulates and/or otherwise process(es) the various data object(s) embodied therein to generate and/or otherwise determine data objects as depicted and described.

For example, as illustrated, the computing environment includes a data sequence set 302. The data sequence set 302 embodies one or more data object(s) that may store any number of data sequences. For example, as illustrated, the data sequence set 302 includes each of the data sequences 302A-302G. Each of the data sequences 302A-302G includes a plurality of tokens embodying the data sequence. For example, in some embodiments, each of the data sequences 302A-302G embodies a sentence for processing. In some such embodiments, the sentences include tokens embodying each word of the sentence. Additionally or alternatively, in some such embodiments, each of the data sequences 302A-302G embodying a sentence further begins with a delimiting token (e.g., a start of sequence token), and/or ends with a delimiting token (e.g., an end of sequence token). Additionally or alternatively still, in some such embodiments, one or more of the data sequences 302A-302G includes a token embodying punctuation marks included in the sentence.

The data sequence set 302 may be obtained in any of a myriad of manners. For example, in some embodiments, the data sequence set 302 is collected and/or otherwise aggregated by the probabilistic data sequence validation apparatus 200 maintaining the computing environment depicted and described. Alternatively or additionally, in some embodiments, the data sequence set 302 is received by the probabilistic data sequence validation apparatus 200 maintaining the computing environment based on client input. For example, a user of a client device inputs a file and/or other collection of data sequences embodying the data sequence set 302 for processing.

The computing environment further includes the language model 304. The language model 304 embodies one or more algorithmic, statistical, and/or machine-learning models configured to generate and/or otherwise calculate a perplexity value for each token in a data sequence. Additionally or alternatively, in some embodiments, the language model 304 is configured to generate another probabilistic value for the data sequence as a whole. For example, in some embodiments, the language model 304 generates a probabilistic ranking set based on the perplexity value set (or other probability values) for a particular data sequence, such as embodying an average sequence perplexity value set, an area violating threshold value set, and/or a bucket-based sequence perplexity value. In some other embodiments, for example as depicted, the probabilistic ranking set 308 is calculated from the perplexity value sets 306 generated by the language model 304.

The language model 304 may be trained on any corpus of data sequences to generate the probability of a particular token appearing in a particular data sequence based on surrounding context for the token. For example, in some embodiments, the language model 304 is trained on data sequences from a particular language domain. One such example language domain is press releases of FTSE 100 companies listed on the London Stock Exchange. Another example language domain is articles posted on the free encyclopedia website Wikipedia. It should be appreciated that, in this regard, a number of training data sequences may be extracted, collected, and/or otherwise received for use in training a language model to produce the language model 304 with respect to a particular domain. For example, in a circumstance where the language model 304 is trained with respect to FTSE 100 company press releases, a set of such press releases may be obtained, scraped from the web, and/or otherwise compiled, and processed to extract the various sentences that make up the press release. These sentences may each embody a data sequence utilized to train the language model to produce the language model 304. It should be appreciated that such a training example is exemplary, and the language model 304 may in fact be trained for any desired language domain. Alternatively or additionally, multiple language models may be trained on different language domains, such that the appropriate data model is usable for purposes of performing probabilistic data sequence validation, as described herein, for that particular language domain.

The language model is configured to generate a probability associated with the validity of a particular data sequence including one or more tokens within a particular corpus. In this regard, it should be appreciated that the probability of the data sequence for the particular corpus may be utilized to derive the entropy associated with the data sequence and particular corpus. Similarly, the perplexity associated with the data sequence, and/or individual tokens thereof, may be derived from the entropy associated with the data sequence. Example equations are provided herein, and it should be appreciated that such equations are exemplary and not intended to limit the scope and spirit of the disclosure.

In some embodiments, the language model 304 is configured to generate a perplexity value corresponding to an input data sequence based on the equation:

$$\text{perplexity} = b^l \qquad \text{EQUATION 1:}$$

In this equation, b represents any number serving as a logarithmic base, for example in the following equation. For example, 2 may be used as an example numerical base in some embodiments. In other embodiments, 10 may be used as an example numerical base.

In this regard, l is determined based on the equation:

$$l = \frac{1}{M} \sum_{i=1}^{m} \log_b p(s_i) \qquad \text{EQUATION 2}$$

In this equation, m represents the set of sequences (s) on which a model is tested, M represents the total number of words in the set of sequences s, and $p(s_i)$ represents the learned probability distribution or probability model that predicts a sample data sequence being in a language.

A perplexity value may be determined for a particular language model to represent the accuracy of the language model in predicting the data sequences in a particular corpus. For example, a user may provide a corpus of defined data sequences, such as 300 human-generated texts. The corpus may be split into two sets of data, such as a first set of data sequences utilized for training (e.g., 80% of the corpus) and a second set of data sequences utilized for testing (e.g., the remaining 20% of the corpus). Upon training the language model utilizing the training set of data sequences, this language model may be utilized to generate a model perplexity value (or multiple perplexity values), based on the test set of data sequences, that represents the accuracy of the language model. The model perplexity value for the language model may be stored and/or otherwise utilized in further operations associated with the language model, for example as a soft perplexity threshold for purposes of arranging data sequences (e.g., by rank, into groups, and/or the like as described herein).

Additionally or alternatively, in some embodiments multiple language models may be trained and tested based on a shared corpus. In some such embodiments, the language model associated with the most preferable perplexity value (e.g., the lowest perplexity value) may be selected for use. For example, in this regard, different language models may be chosen for different domains, languages, and/or the like.

A language model may then be used to generate a probability for each token of a data sequence, representing how probable the token is to exist in a valid data sequence of the data sequence based on the surrounding context for the token. The probability may be transformed into a space that enables comparison with the perplexity value(s) determined for the language model determined during testing. For example, a token perplexity value may be generated for each token giving its surrounding context, wherein the token perplexity value for a given token is determined based on the equation:

$$\text{token\_perplexity} = b^{-tl} \qquad \text{EQUATION 3:}$$

In this equation, tl represents the token cross-entropy and b represents the logarithmic base, for example utilized to generate the perplexity value for the language model. In this regard, equation 2 described herein for l may be utilized to generate the token complexity (ll) for a particular token, where now, for tl, m is equal to 1 and M is equal to 1. The individual token perplexity values may be utilized to determine how surprising a particular token and/or data sequence is with respect to a particular valid corpus, and/or identify tokens and/or data sequences unlikely to be valid within the particular valid corpus.

In some such embodiments, the token perplexity associated with a particular token in a data sequence is determinable based on one or more tokens surrounding the particular token being processed. For example, in this regard, a "left context" associated with a particular token is determinable based on the preceding tokens in the data sequence up to a certain number of preceding tokens represented by a left context limit (e.g., up to 12 tokens preceding the token being processed). In some such embodiments, the left context limit may be predefined, user-assigned, and/or otherwise determined. Similarly, in this regard, a "right context" associated with a particular token is determinable based on the subsequent tokens in the data sequence up to a certain number of subsequent tokens represented by a right context limit (e.g., up to 7 tokens following the token being processed). In some embodiments, the right context limit may be predefined, user-assigned, and/or otherwise determined (e.g., to match the left context limit). In this regard, a particular token to be processed may be processed together with a determined left and right context corresponding to that token based on the other tokens in the data sequence.

In some embodiments, the perplexity value sets 306 embodies one or more data objects storing a perplexity value set generated for each data sequence of the data sequence set 302. In this regard, the perplexity value sets 306 embodies each of the perplexity value set 306A-306G, as depicted. The perplexity value set 306A embodies the perplexity value for each token in the data sequence 302A. Similarly, the perplexity value set 306B embodies the perplexity value for each token in the data sequence 302B, and so on. In this regard, the language model 304 may process each of the data sequences of the data sequence set 302 to generate the perplexity value set corresponding to that data sequence. It should be appreciated that, in other embodiments, a probability value set is stored including a probability value for each data sequence of the data sequence set, for example where the probability value indicates a likelihood of validity or represents another probabilistic determination derived from or embodying another probability-based metric.

In some embodiments, the probabilistic ranking set is generated based on the perplexity value sets 306 corresponding to the data sequence set 302. In this regard, the probabilistic ranking set is generated based on at least one sequence arrangement metric. In this regard, the probabilistic ranking set 308 may include a probabilistic ranking generated for each of the data sequences 302A-302G that represents a determinable metric utilized to rank the overall level of perplexity for that data sequence. In some embodiments, for example, the probabilistic ranking set 308 is generated such that higher probabilistic rankings indicate that the data sequence is surprising based on the context utilized to train the language model 304, and/or otherwise is more likely to be an invalid data sequence within the language domain utilized to train the language model 304. Non-limiting examples perplexity arrangement metrics utilized to generate the probabilistic ranking set 308 include an average sequence perplexity value calculated for each data sequence of the data sequence set 302 based on a corresponding perplexity value set of the perplexity value sets 306, an area violating threshold value calculated for each data sequence of the data sequence set 302 based on a corresponding perplexity value set of the perplexity value sets 306, and/or a bucket-based sequence perplexity value calculated for each data sequence of the data sequence set 302 based on a corresponding perplexity value set of the perplexity value sets 306, as described herein.

As depicted, the probabilistic ranking set 308 is utilized to generate the arranged data sequences 310. The arranged data sequences 310 includes some or all of the data sequence set 302 arranged based on the probabilistic ranking set 308. For example in some contexts, the arranged data sequences 310 include the data sequence set 302 arranged such that the data sequences that are associated with the highest probabilistic rankings are sorted first in the arranged data sequences 310, and the data sequences that are associated with the lowest probabilistic rankings are sorted last in the arranged data sequences 310. In some such embodiments, the higher probabilistic rankings indicate that the corresponding data sequence is more surprising and less likely to be valid within the language domain upon which the language model 304 was trained. Conversely, in some such embodiments, the lower probabilistic rankings indicate that the corresponding data sequence is less surprising and more likely to be valid within the language domain upon which the language model 304 was trained. In other embodiments, lower probabilistic rankings indicate that the corresponding data sequence is more surprising and less likely to be valid within the language domain upon which the language model 304 was trained, and higher probabilistic rankings indicate that the corresponding data sequence is less surprising and more likely to be valid within the language domain upon which the language model 304 was trained.

FIG. 4 illustrates a simplified data example processed for probabilistic data sequence validation using perplexity in accordance with at least some example embodiments of the present disclosure. In this regard, such data objects may be embodied and processed within a computing environment (e.g., a software computing environment) maintained by the probabilistic data sequence validation apparatus 200. In some such embodiments, the various data objects are maintained and processed within the computing environment maintained by the probabilistic data sequence validation apparatus 200.

FIG. 4 depicts an example data sequence set 402. The data sequence set 402 comprises data sequence 402A, which includes a token sequence embodying the sentence "the stock roared": a start of sequence (SOS) token indicating the start of the data sequence 402A, the word "the," the word "stock," the word "roared," and an end of sequence (EOS) token indicating the end of the data sequence 402A. The data sequence set 402 further comprises a data sequence 402B, which includes a token sequence embodying the sentence "the stock soared": a SOS token, the word "the," the word "stock," the word "soared" and an EOS token. The data sequence set 402 further comprises a data sequence 402C, which includes a token sequence embodying the sentence "the stock rose": a SOS token, the word "the," the word "stock," the word "rose," and an EOS token. The data sequence set 402 stores the data sequences 402A-402C in an arbitrary order and/or in a particular order, such as the order the input data sequences were received. As depicted, for example, the data sequence set 402 embodies an array organized from right to left, such that data sequence 402C is positioned first in the array, followed by data sequence 402B in the second position, subsequently followed by data sequence 402C in the third position.

Each of data sequences in the data sequence set 402 is processed to generate and/or otherwise calculate a corresponding perplexity value set. In some embodiments, the perplexity value set for each of the data sequences in the data sequence set 402 is calculated utilizing a language model. Utilizing the sentences depicted, the language model may be trained on a corpus of data sequences representing reports of FTSE 100 companies. In this regard, each of the data sequences 402A-402C are input into the language model to generate the corresponding perplexity value set corresponding to each of the data sequences 402A-402C.

As illustrated, for example, the data sequences 402A-402C are utilized to calculate the corresponding perplexity value sets 404A-404C, respectively. In this regard, the data sequence 402A corresponds to the perplexity value set 404A, the data sequence 402B corresponds to the perplexity value set 404B, and the data sequence 402C corresponds to the perplexity value set 404C. Each of the perplexity value sets 404A-404C includes a perplexity value for each token in the corresponding data sequence. For example, the perplexity value set 404B includes a perplexity value of 0 corresponding to the first token of the data sequence 402B (the SOS token), a perplexity value of 10 corresponding to the second token of the data sequence 402B (the word "the"), a perplexity value of −10 corresponding to the third token of the data sequence 402B (the word "stock"), a perplexity value of 100 for the fourth token of the data sequence 402B (the word "soared"), and a perplexity value of 0 for the fifth token of the data sequence 402B (the EOS token). Further, the perplexity value set 404A includes the same perplexity values as the perplexity value set 404B except with respect to the perplexity value for the fourth token of the data sequence 402A (the word "roared"), which is associated with a significantly higher perplexity value of 10000 as it is much more surprising within the corpus. Further still, the perplexity value set 404C include the same perplexity values as the perplexity value set 404B except with respect to the perplexity value for the fourth token of the data sequence 402C (the word "rose"), which is associated with a lower perplexity value of 10 as it is less surprising within the corpus.

In this regard, the differences between the different data values for the fourth tokens in each data sequence (namely, "roared," as opposed to "rose" as opposed to "soared") indicates that the fourth token for the data sequence 402C ("rose") and surrounding contexts are the least surprising based on the corpus from which the corresponding language model was trained, the fourth token for the data sequence 402A ("roared") and the surrounding contexts are the most surprising based on the corpus from which the corresponding language model was trained, and the fourth token for the data sequence 402B ("soared") and the surrounding contexts are more surprising than that of the data sequence 402C but less surprising than the data sequence 402A based on the corpus from which the corresponding language model was trained. For example, "soared" may represent a rare but present descriptor within a particular corpus used to train a language model, whereas "roared" may never appear. Continuing this example, "roared" may result in a data sequence due to a typographical error by a user that generated the data sequence(s), such that the token (and similarly, the data sequence as a whole) is more surprising. It should be appreciated that in some embodiments where a left context and a right context are considered, the token perplexities may differ dependent on how many tokens for each of the left and/or right context are considered. For example, if a right context of 3 or more tokens is considered, each token perplexity would differ based on the existence of the different words represented at the fourth position in each data sequence.

As depicted and described, the tokens of each data sequence may be arranged in a particular order. For example, the tokens are ordered based on a reading direction for the language of such tokens, in the depicted example ordered from left-to-right. It should be appreciated that, for other languages and/or data sequences, the tokens may be arranged in a different order, for example from right-to-left according to the reading direction for a different language of such tokens. In some such embodiments, the data sequences representing the right-to-left ordered tokens may be reversed to embody the right-to-left direction associated with the tokens.

Each of the perplexity value sets 404A-404C are utilized to generate perplexity ranking value(s) and/or arrange the data sequences 402A-402C. For example, in some embodiments, the perplexity value sets 404A-404C are each utilized to generate a probabilistic ranking for each of the data sequences set 402 based on a particular perplexity arrangement metric. In one such example context, the perplexity value sets 404A-404C are each utilized to generate a mean perplexity value corresponding to each of the data sequences 402A-402C, as described herein. In this regard, the mean perplexity values for data sequence 402A represents the highest mean perplexity value, the mean perplexity value for data sequence 402B represents the second highest mean perplexity value, and the mean perplexity value for data sequence 402C represents the lowest mean perplexity values. In some such embodiments, the perplexity ranking value for each of the data sequences 402A-402C (embodied by a mean perplexity value set, for example) are utilized to arrange the data sequences 402A-402C.

In this regard, as illustrated, arrangement 406 is generated. The arrangement 406 includes the data sequences 402A-402C in a defined order. Specifically, the arrangement 406 begins with the data sequence 402A in the first position, as the data sequence 402A is associated with the highest probabilistic ranking, followed by the data sequence 402B in the second position as the data sequence 402B is associated with the next highest perplexity ranking, and followed by the data sequence 402C in the third position as associated with the lowest probabilistic ranking. In this regard, the arrangement 406 may further processed and/or presented in order to enable further processing. For example, a determinable number of data sequences from the beginning of the arrangement 406 may be processed, a number of data sequences above a particular threshold may be further processed, and/or the like. Alternatively or additionally, in some embodiments, in some embodiments the arrangement 406 is presented via rendering to a user for purposes of quality assurance, verification of the data sequences indicated as most surprising (e.g., those first in the arrangement 406), and/or the like.

It should be appreciated that, in some embodiments, the arrangement 406 is embodied by sorting the data sequence set 402, such that an additional data object is not required. In some other embodiments, the arrangement 406 is generated as a separate data object (e.g., a second, sorted array) based on the data sequence set 402.

Example Graphical Depictions of Perplexity for Various Sequence Arrangement Metrics of the Disclosure FIG. 5 illustrates a graphical depiction of an example relationship between token perplexity values for example data sequences and data sequence validity using mean sequence perplexity values in accordance with at least some example embodiments of the present disclosure. Specifically, FIG. 5 includes three graphical depictions of perplexity values for each token of various different data sequences. For example, the token perplexity graph 502A includes perplexity values for a first token sequence embodying a first data sequence, the token perplexity graph 502B includes perplexity values for a second token sequence embodying a second data sequence, and the token perplexity graph 502C includes perplexity values for a third token sequence embodying a third data sequence. In each of the depicted token perplexity graphs 502A-502C, each of the plotted dots represents the perplexity value for a corresponding token at a particular position in the corresponding data sequence. In each of the depicted token perplexity graphs 502A-502C, an unacceptable perplexity threshold, a soft perplexity threshold, and a lowest perplexity line are shown.

Each of the depicted token perplexity graphs 502A-502C are depicted together with an indicator of which of the token perplexity graphs 502A-502C represent higher perplexity and thus more problematic data sequences (e.g., more likely to be invalid) as opposed to lower perplexity and less problematic data sequences (e.g., less likely to be invalid). The overall perplexity for a particular data sequence is represented by a probabilistic ranking embodying an average sequence perplexity value determined from the various perplexity values plotted in the corresponding token perplexity graph of the token perplexity graphs 502A-502C.

For example, in this regard, the average sequence perplexity value associated with the data sequence corresponding to the first token perplexity graph 502A is calculated by summing each of the perplexity values for each of the plotted points and dividing by the total number of tokens in the data sequence (e.g., the sequence length) corresponding to the first token perplexity graph 502A. Similarly, the average sequence perplexity value associated with the data sequence corresponding to the second token perplexity graph 502B is calculated by summing each of the perplexity values for each of the plotted points and dividing by the total number of tokens in the data sequence corresponding to the second token perplexity graph 502B. Further, the average sequence perplexity value associated with the data sequence corresponding to the third token perplexity graph 502C is calculated by summing each of the perplexity values for each of the plotted points and dividing by the total number of tokens in the data sequence corresponding to the third token perplexity graph 502C.

As depicted, the average sequence perplexity value for each token perplexity graph decreases for each of the depicted token perplexity graphs 502A-502C from top to bottom. For example the average sequence perplexity value for the depicted token perplexity graph 502A is higher than that the average sequence perplexity value for the depicted token perplexity graph 502B, which is also higher than the average sequence perplexity value for the depicted token perplexity graph 502C. In this regard, the changes in the average sequence perplexity values between each of the token perplexity graphs is depicted based on the changes to the perplexity value for one or more tokens therein. It should be appreciated that, in this regard, the more problematic data sequences having a higher mean sequence perplexity value (e.g., the data sequence associated with the token perplexity graph 502A) are arranged first before less problematic data sequences having a lower mean sequence perplexity value (e.g., the data sequence associated with the token perplexity graph 502B, and then the data sequence associated with the token perplexity graph 502C). In this regard, the average sequence perplexity value for each data sequence functions as a sequence arrangement metric for purposes of sorting (or otherwise arranging) the data sequences into a particular arrangement.

FIG. 6 illustrates a graphical depiction of an example relationship between token perplexity values for example data sequences and data sequence validity using bucket-based sequence perplexity values in accordance with at least some example embodiments of the present disclosure. Specifically, FIG. 6 includes three graphical depictions of perplexity values for each token of various different data sequences. For example, the token perplexity graph 602A includes perplexity values for a first token sequence embodying a first data sequence, the token perplexity graph 602B includes perplexity values for a second token sequence embodying a second data sequence, and the token perplexity graph 602C includes perplexity values for a third token sequence embodying a third data sequence. As similarly described with respect to FIG. 5, in each of the depicted token perplexity graphs 602A-602C, each of the plotted dots represents the perplexity value for a corresponding token at a particular position in the corresponding data sequence. In each of the depicted token perplexity graphs 602A-602C, an unacceptable perplexity threshold, a soft perplexity threshold, and a lowest perplexity line are shown.

Each of the depicted token perplexity graphs 602A-602C are similarly depicted together with an indicator of which of the token perplexity graphs 602A-602C represent higher perplexity and thus more problematic data sequences (e.g., more likely to be invalid) as opposed to lower perplexity and less problematic data sequences (e.g., less likely to be invalid). The overall perplexity for a particular data sequence is represented by a probabilistic ranking embodying an average sequence perplexity value determined from the various perplexity values plotted in the corresponding token perplexity graph of the token perplexity graphs 602A-602C.

Each of the illustrated token perplexity graphs 602A-602C are depicted including a number of unacceptable buckets 604A-604C. The unacceptable buckets 604A-604C are associated with different order of magnitudes. In this regard, the unacceptable buckets associated with a higher order of magnitude may indicate that a token associated with a perplexity value that falls in the unacceptable bucket of a higher order of magnitude are more surprising than those that fall in an unacceptable bucket of a lower order of magnitude. For example, tokens associated with a perplexity value falling within the unacceptable bucket 604C are indicated as more surprising than a token associated with a perplexity value that falls within the unacceptable bucket 604B, which further is indicated as more surprising than a token associated with a perplexity value that falls within the unacceptable bucket 604A.

The unacceptable bucket count value for a particular data sequence embodies a representation of the number of token values that are associated with perplexity values falling in the unacceptable buckets 604A-604C. In some embodiments, the unacceptable buckets are utilized to generate a bucket-based sequence perplexity value for each data sequence. For example, unacceptable buckets 604A-604C are utilized to determine the unacceptable bucket count value for each of the data sequences corresponding to the token perplexity graphs 602A-602C. In some embodiments, the higher order unacceptable buckets (e.g., unacceptable bucket 604C) is weighted higher than those of a lower order of magnitude (e.g., unacceptable bucket 604A). A non-limiting example equation for determining an unacceptable bucket count value for a particular data sequence embodies:

$$a = \frac{1}{m}\sum_{i=0}^{n} 10^{i} C_{i},$$ EQUATION 4

In this equation, a represents the unacceptable bucket count value embodying a probabilistic ranking for the particular data sequence. Further, m represents the number of tokens in the particular data sequence. Further, i represents the order of the unacceptable bucket. Further, n represents a number of unacceptable buckets minus 1. Further, $C_i$ represents a number of tokens in an unacceptable bucket of the order of magnitude represented by i. In this equation, the higher order of magnitude unacceptable buckets are weighted more heavily for purposes of determining the corresponding unacceptable bucket count value. It should be appreciated that the base number "10" weights such higher order buckets with greater values, and in other embodiments another base number may be utilized (e.g., $X^i$ where X is any number greater than 1) to enable greater weighting of the higher order buckets.

As depicted, the unacceptable bucket count value for each token perplexity graph decreases for each of the depicted token perplexity graphs 602A-602C from top to bottom. For example, such unacceptable bucket count values may be determined utilizing the equation described herein. In this regard, while the token perplexity graph 602B includes less tokens in unacceptable buckets 604A-604C than the token perplexity graph 602C, the token perplexity graph 602B is nevertheless associated with a higher unacceptable bucket count value due to having a second token in a higher order unacceptable bucket as compared to the token perplexity graph 602C. It should be appreciated, as described, the unacceptable bucket count value for each data sequence functions as a sequence arrangement metric for purposes of sorting (or otherwise arranging) the data sequences corresponding to the token perplexity graphs 602A-602C into a particular arrangement of such data object(s).

FIG. 7 illustrates a graphical depiction of an example relationship between token perplexity values for example data sequences and data sequence validity using area violating threshold values in accordance with at least some example embodiments of the present disclosure. Specifically, FIG. 7 includes three graphical depictions of perplexity values for each token of various different data sequences. For example, the token perplexity graph 702A includes perplexity values for a first token sequence embodying a first data sequence, the token perplexity graph 702B includes perplexity values for a second token sequence embodying a second data sequence, and the token perplexity graph 702C includes perplexity values for a third token sequence embodying a third data sequence. In each of the depicted token perplexity graphs 702A-702C, each of the plotted dots represents the perplexity value for a corresponding token at a particular position in the corresponding data sequence. In each of the depicted token perplexity graphs 702A-702C, a soft perplexity threshold, and a lowest perplexity line are shown.

Each of the depicted token perplexity graphs 702A-702C are depicted together with an indicator of which of the token perplexity graphs 702A-702C represent higher perplexity and thus more problematic data sequences (e.g., more likely to be invalid) as opposed to lower perplexity and less problematic data sequences (e.g., less likely to be invalid). The overall perplexity for a particular data sequence is represented by a probabilistic ranking embodying an area violating threshold value determined from the various perplexity values plotted in the corresponding token perplexity graph of the token perplexity graphs 702A-702C.

Each area violating threshold value for a data sequence is determinable associated with an unacceptable perplexity threshold, specifically the unacceptable perplexity threshold 704. The unacceptable perplexity threshold represents a determinable, predetermined, and/or user-set threshold value above which perplexity value(s) are indicated as problematic and/or otherwise surprising (e.g., and thus likely to be invalid). For example, in this regard, the area violating threshold value associated with the data sequence corresponding to the first token perplexity graph 702A is calculated based on the area above the unacceptable perplexity threshold 704 that is formed by each of the perplexity values for the tokens embodying the data sequence represented by the first token perplexity graph 702A. Similarly, the area violating threshold value associated with the data sequence corresponding to the second token perplexity graph 702B is calculated based on the area above the unacceptable perplexity threshold 704 that is formed by each of the perplexity values for the tokens embodying the data sequence representing the second token perplexity graph 702B. Similarly, the area violating threshold value associated with the data sequence corresponding to the third token perplexity graph 702C is calculated based on the area above the unacceptable perplexity threshold 704 that is formed by each of the perplexity values for the tokens embodying the data sequence representing the third token perplexity graph 702C.

As depicted, the area violating threshold value for each token perplexity graph decreases for each of the depicted token perplexity graphs 702A-702C from top to bottom. For example, the area violating threshold value for the depicted token perplexity graph 702A is higher than the area violating threshold value for the depicted token perplexity graph 702B, which is also higher than the area violating threshold value for the depicted token perplexity graph 702C. In this regard, the changes in the area violating threshold values between each of the token perplexity graphs is depicted based on the changes to the area above the unacceptable perplexity threshold 704 for each of the token perplexity graphs 702A-702C caused by differences in the token perplexity/perplexities for one or more tokens of the corresponding data sequences. It should be appreciated that, in this regard, the more problematic data sequences having a higher area violating threshold value (e.g., the data sequence associated with the token perplexity graph 702A) are arranged first before less problematic data sequences having a lower area violating threshold value (e.g., the data sequence associated with the token perplexity graph 702B, and then the data sequence associated with the token perplexity graph 702C). In this regard, the area violating threshold value for each data sequence functions as a sequence arrangement metric for purposes of sorting (or otherwise arranging) the data sequences into a particular arrangement.

In some embodiments, the token perplexities are normalized based on a determinable value. For example, in one or more embodiments, each token perplexity is normalized based on a mean token perplexity determined for a particular language model at a particular position in a data sequence. Alternatively or additionally, in one or more embodiments, each token perplexity is normalized based on a median token perplexity determined for a particular language model at a particular position in a data sequence. In some embodiments where the token perplexities are normalized, an area violating threshold value is determined based on multiple unacceptable perplexity thresholds, such as a lower unacceptable perplexity threshold at a particular offset below the determinable value utilized to normalize the token perplexities and an upper unacceptable perplexity threshold at the particular offset above the determinable value utilized to normalize the token perplexities. In this regard, the area violating threshold value may be determined based on an area below the lower unacceptable perplexity threshold and a second area above the upper unacceptable perplexity threshold.

FIG. 8A illustrates a graphical depiction of a perplexity value set for a detailed example data sequence for a particular language domain in accordance with at least some example embodiments of the present disclosure. Specifically, FIG. 8A depicts a token perplexity graph 800 including a normalized perplexity value set for the data sequence embodying the sentence "Sales were driven by 5% to $21M." In this regard, the data sequence includes the plurality of tokens, including a SOS token, each word, each punctuation mark, and an EOS token in the sentence. In some embodiments, a language model is utilized to calculate and/or otherwise generate the perplexity value for each token in the data sequence depicted and described. As described herein, the token perplexity graph 800 depicts each token together with a perplexity value corresponding to the token. The various perplexity values associated with the token sequence for the data sequence are linearly connected to form the perplexity value path 806 associated with the data sequence. The perplexity value path 806 embodies connections (e.g., a linear interpolation) between the token perplexity values for each token of a particular data sequence. In this regard, the perplexity value for each token represented in the perplexity value path 806 may be determined and/or otherwise processed (e.g., individually or as a subset of one or more token perplexity value(s)), and/or the entirety of the perplexity value path 806 may be determined and/or processed.

The token perplexity graph 800 further includes a model soft perplexity threshold 804. In some embodiments, the model soft perplexity threshold 804 represents a particular token perplexity value calculated via a particular language model for tokens of each data sequence from a test set of data sequences. In other embodiments, the model soft perplexity threshold 804 represents another algorithmically determined perplexity value generated by a trained learning model, such as a median perplexity value generated by the particular language model for a token at a particular position. In some embodiments, the language model is configured to generate one or more token perplexity value(s) for one or more tokens of a particular data sequence based on a particular perplexity offset, for example based on one or more positions of the token and/or the context data embodying the token(s) surrounding the particular token being processed. For example, the language model may be associated with a user-configurable, system predefined, and/or otherwise determinable perplexity offset for the one or more token(s) in a particular data sequence. In some embodiments, for example, the perplexity values for a first determined number of tokens are each associated with a particular perplexity offset that accounts for minimal context data from tokens preceding the token being processed via the language model (e.g., a first token starting a data sequence associated with a first perplexity offset, a second token in the data sequence associated with a second perplexity offset, and a third token in the data sequence associated with a third perplexity offset). Additionally or alternatively, in some embodiments, for example, the perplexity values for a second determined number of tokens are each associated with a particular perplexity offset that accounts for minimal context data from tokens succeeding the token being processed via the language model (e.g., a final token ending a data sequence associated with a first perplexity offset, a second token that is second-to-last of the data sequence associated with a second perplexity offset, and a third token that is third-to-last of the data sequence associated with a third perplexity offset). In some embodiments, a probabilistic data sequence validation apparatus 200 is specially configured to maintain perplexity offset(s) for one or more language model(s) and/or positions in a data sequence, for example storing the values for such perplexity offsets based on user input and/or system configurations or system determinations.

The token perplexity graph 800 includes an unacceptable perplexity threshold 802. In some embodiments, the unacceptable perplexity threshold 802 is determinable based on one or more other data values, such as based on a determined model soft perplexity threshold 804. For example, in at least one embodiment, the unacceptable perplexity threshold 802 is determined based on applying a percentage increase and/or multiplier to the model soft perplexity threshold 804 at a particular position. For example, in some embodiments, the unacceptable perplexity threshold 802 at a particular position (e.g., a certain number of tokens in a data sequence) is generated by applying a 20% increase to the determined model soft perplexity threshold 804 at the same position. Alternatively or additionally, in some embodiments, the unacceptable perplexity threshold 802 at a particular position is generated by applying a 2× multiplier to the determined model soft perplexity threshold 804 at the same position. Alternatively or additionally, in some embodiments, the unacceptable perplexity threshold 802 is determinable based on one or more absolute value(s) set by a user.

As depicted in FIG. 8A, the perplexity value(s) represented by the perplexity value path 806 exceeds the unacceptable perplexity threshold 802 only for one token of the data sequence. Specifically, the perplexity value for the token "driven" exceeds the unacceptable perplexity threshold 802, as depicted, as indicated by perplexity value 808. In this regard, the perplexity value 808 indicates that the token "driven" is surprising at the corresponding position in the data sequence (e.g., following the other tokens providing a left context and/or right context for the token).

The remainder of the data sequence is associated with relatively low perplexity values. In this regard, the particular data sequence is less surprising overall with respect to the corpus of data sequences utilized to train a language model that generated the perplexity value set embodying the perplexity value path 806. In this regard, a probabilistic sequence ranking for the data sequence (e.g., an average sequence perplexity value, area violating threshold value, and/or unacceptable bucket count value) is generated with a lower value than the data sequence subsequently described with respect to FIG. 8B, and a greater value than the data sequence subsequently described with respect to FIG. 8C. In this regard, the data value associated with the data sequence indicates the sentence is moderately problematic and, as the perplexity value 808 exceeds the unacceptable perplexity threshold 802, the data sequence is likely to include at least one mistake based on the language domain on which a language model is trained.

FIG. 8B illustrates a graphical depiction of a perplexity value set for another detailed example data sequence for the particular language domain in accordance with at least some example embodiments of the present disclosure. Specifically, FIG. 8B depicts a token perplexity graph 850 including a perplexity value set for the data sequence embodying the sentence "Sales were driven to despair." In this regard, the data sequence includes a plurality of tokens, including a SOS token, each word, each punctuation mark, and an EOS token in the sentence. In some embodiments, a language model is utilized to calculate and/or otherwise generate the perplexity value for each token in the data sequence depicted and described. As described herein, the token perplexity graph 850 depicts each token together with a perplexity value corresponding to the token. The various perplexity values associated with the token sequence for the data sequence are linearly connected to form the perplexity value set associated with the data sequence. The token perplexity graph 850 similarly includes the model soft perplexity threshold 804 and the unacceptable perplexity threshold 802.

As depicted, the perplexity value(s) represented by the perplexity value path 852 exceeds the unacceptable perplexity threshold 802 for multiple tokens at multiple positions. Specifically, the perplexity value for the token "despair" significantly exceeds the unacceptable perplexity threshold 802, as depicted, as indicated by perplexity value 854. In this regard, the perplexity value 854 indicates that for the token "despair" is surprising at the end of the data sequence (e.g., as the next token in the data sequence given the prior/left context and subsequent/right context associated with the token). Perplexity values for other tokens of the data sequence, for example the "sales" token and the "driven" token, both exceed the unacceptable perplexity threshold 802.

In this regard, the data sequence is quite surprising with respect to the corpus of data sequences utilized to train a language model that generated the perplexity value set embodying the perplexity value path 852. In this regard, a probabilistic sequence ranking for the data sequence (e.g., an average sequence perplexity value, area violating threshold value, and/or unacceptable bucket count value) for the data sequence is generated with a higher value indicating the sentence is more problematic than the data sequence depicted and described with respect to FIG. 8A, and is more likely to be an invalid sentence within the language domain on which a language model is trained. It should be appreciated that, in some embodiments, the tokens that exceed and/or otherwise fail to satisfy the unacceptable perplexity threshold 802 are marked and/or otherwise indicated as such. For example, in some such embodiments, one or more tokens marked as failing to satisfy the corresponding unacceptable perplexity threshold are presentable via one or more user interfaces for viewing and/or processing by a user. Alternatively or additionally, in circumstances where various data sequence(s) are presented in a particular order, the data sequence depicted and described with respect to FIG. 8B may be presented for user validation and/or correction first as compared to the data sequence depicted and described with respect to FIG. 8A, for example based on the increased probabilistic sequence ranking.

FIG. 8C illustrates a graphical depiction of a perplexity value set for a third detailed example data sequence for the particular language domain in accordance with at least some example embodiments of the present disclosure. Specifically, FIG. 8C depicts a token perplexity graph 870 including a perplexity value set for the data sequence embodying the sentence "Sales were driven strong performance in the final services market." In this regard, the data sequence includes a plurality of tokens, including a SOS token, each word, each punctuation mark, and an EOS token in the sentence. In some embodiments, a language model is utilized to calculate and/or otherwise generate the perplexity value for each token in the data sequence depicted and described. As described herein, the token perplexity graph 870 depicts each token together with a perplexity value corresponding to the token. The various perplexity values associated with the token sequence for the data sequence are linearly connected to form the perplexity value set associated with the data sequence. The token perplexity graph 870 similarly includes the model soft perplexity threshold 804 and the unacceptable perplexity threshold 802.

As depicted, the perplexity value(s) represented by the perplexity value path 872 never exceeds the unacceptable perplexity threshold 802. Indeed, the highest perplexity value 874 exceeds only the model soft perplexity threshold 804. In this regard, while the highest perplexity value 874 for a particular token indicates the token is surprising (e.g., based on the prior/left context and/or subsequent/right context associated with the token), each token individually and the data sequence as a whole are not indicated as likely being problematic. The data sequence is less surprising with respect to the corpus of data sequences utilized to train a language model that generated the perplexity value set embodying the perplexity value path 872. In this regard, a probabilistic sequence ranking for the data sequence (e.g., an average sequence perplexity value, area violating threshold value, and/or unacceptable bucket count value) for the data sequence is generated with a lower value than that for the data sequences depicted and described with respect to FIGS. 8A and 8B. The probabilistic sequence ranking for the data sequence may similarly indicate that the data sequence is most likely to be valid within the language domain on which a language model is trained.

Example Language Model of the Disclosure

FIG. 9 illustrates an example operational structure of a language model for processing a particular example data sequence in accordance with at least some example embodiments of the present disclosure. Specifically, FIG. 9 illustrates operations of an example language model 900 embodied by a long short-term memory (LSTM) model. It should be appreciated that the LSTM model in some embodiments is trained on any corpus of data sequences, as described herein, for any particular language domain. As illustrated, the operations of the example language model 900 are unrolled for purposes of illustration and description. It should be appreciated that, in some embodiments, the LSTM is embodied to produce an output based on an input and a recurrent connection embodying the current state of the LSTM. In this regard, each state (e.g., STATE_1, STATE_2, and/or STATE_3) are utilized to embody the prior data sequence. In this regard, the probability of a particular token is determinable based on some or all of the prior token(s) (and/or, additionally or alternatively in some embodiments, subsequent token(s)) embodied in the state input to the next operational iteration of the LSTM.

Further, it should be appreciated that in other embodiments, a language model may be embodied by any of a myriad of other implementations. For example, in some embodiments, a language model is implemented by one or more statistical, algorithmic, and/or machine learning model(s) known in the art, or equivalents, that embody a language model. In this regard, the particular architecture embodying the language model is not required in particular embodiments of the disclosure.

As depicted in FIG. 9, a first operation 902A is performed that produces the probability that a particular token appears next given one or more context(s) preceding and/or succeeding the next token (e.g., a left context and/or a right context). For example, the first operation 902A processes the first state (STATE_1) and an input token (the SOS token) to produce a probability associated with the next token ("The") in the data sequence. The first operation may similarly process the right context representing the context following the next token (e.g., that "stock" follows "The," "rose" follows "stock," the period follows "stock," and/or that a null context follows the period). In this regard, the operation 902A calculates and/or otherwise determines the probability that "The" appears after the SOS token at the start of the data sequence "The stock rose." The first state and/or input token may embody a set amount of left context and/or right context, for example 12 tokens preceding the next token to be processed and 7 following the next token to be processed.

A second operation 902B is performed that produces a probability for the next token considering a second state (STATE_2) and an input token ("The") for the second position in a data sequence to produce a probability associated with the next token ("stock") in the data sequence. The second operation may similarly process the left context and/or right context for the next token (e.g., a left context embodying that a null context, the SOS token, and subsequently "The" precede the next token and "rose" and a period succeed the next token). In this regard, the operation 902B calculates and/or otherwise determines the probability that "stock" appears in the data sequence given that only the start of sequence token and "The" precede the next token in the data sequence "The stock rose." In some embodiments, the second state represented by STATE_2 includes the previous tokens embodying the left context, and/or in some embodiments includes the right context. In other embodiments, the input embodies an input context including the next token and a right context. In this regard, the operation 902B generates p("stock" "The") based on the input token and the second state.

A third operation 902C is performed that produces a probability for the next token considering a third state (STATE_3) and an input token ("stock") to produce a probability associated with the next token ("rose") in the data sequence. The third operation may similarly process the left context and/or right context for the next token (e.g., a left context embodying that a null, the SOS token, "The," and subsequently "stock" precede the next token and a period succeed the next token). In this regard, the operation 902C calculates and/or otherwise determines the probability that "rose" appears in the data sequence next given that the SOS token, "The," and subsequently "stock" appear before it in the data sequence "The stock rose." In some embodiments, the third state represented by STATE_3 includes the previous tokens embodying a left context, and/or in some embodiments includes the right context. In other embodiments, input embodies an input context including the next token and/or a right context. In this regard, the operation 902C generates p("rose"|"The," "stock") based on the input token and the third state.

It should be appreciated that such operations may continue for any number of tokens in a data sequence. In this regard, each operation generates the probability of a particular data token appearing next in the data sequence based on the token(s) that appear before and/or after the next data token. It should be appreciated that, in some embodiments, only a certain number of tokens before the current token for consideration are processed (e.g., the last 12 tokens, or another number of tokens). Additionally or alternatively, in some embodiments, a certain number of tokens after the current token for consideration are processed (e.g., the next 7 tokens, or another number of tokens). In this regard, the example LSTM depicted and described with respect to FIG. 9 is exemplary and not to limit the scope and spirit of this disclosure.

Example Processes of the Disclosure

Having described example systems, apparatuses, computing environments, and example data manipulation, example processes in accordance with the present disclosure will now be described. It should be appreciated that each of the flowcharts depicts an example computer-implemented process that may be performed by one or more of the computing devices, systems, and/or apparatuses described herein, and/or the various components thereof. The blocks indication operations of each process may be arranged in any of a number of ways, including but not limited to as depicted and described herein.

In some such embodiments, one or more blocks of any of the processes described herein occur in-between one or more blocks of another process, before one or more blocks of another process, in parallel with one or more blocks of another process, and/or otherwise operates as a sub-process of another process. Additionally or alternatively, any of the processes may include some or all of the operations described and/or depicted, including one or more optional operational blocks in some embodiments. In yet other embodiments, only some (but not all) or none of the optional operational blocks are included. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 10 illustrates a flowchart depicting example operations of an example process 1000 for data sequence validity processing in accordance with at least some example embodiments of the present disclosure. In some embodiments, the process 1000 is embodied by computer program code stored on a non-transitory computer-readable medium of a computer program product configured for execution to perform the computer-implemented process described. Alternatively or additionally, in some embodiments, the process 1000 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1000 is described with respect to performance by the probabilistic data sequence validation apparatus 200.

The process 1000 begins at operation 1002. At operation 1002, the probabilistic data sequence validation apparatus 200 includes means, such as the data sequence processing circuitry 210, communications circuitry 208, input/output circuitry 206, processor 202, and/or the like, or a combination thereof, configured for receiving a plurality of data sequences, each data sequence comprising a token sequence. In this regard, the token sequence may embody the corresponding data sequence. For example, in at least one example context where the data sequences embody sentences, each token represents a word, punctuation mark, or other symbol in the sentence (e.g., a special character, SOS token, EOS token, and/or the like).

In some embodiments, the probabilistic data sequence validation apparatus 200 receives the plurality of data sequences in response to user input. For example, in some embodiments the user selects a file including the plurality of data sequences for providing to the probabilistic data sequence validation apparatus 200. Alternatively or additionally, in some embodiments, the probabilistic data sequence validation apparatus 200 receives the plurality of data sequences automatically (e.g., from a process that automatically provides data sequences to the probabilistic data sequence validation apparatus 200 for performing probabilistic data sequence verification as described herein). In some embodiments, the plurality of data sequences is provided in a separable manner (e.g., in a comma separated format or another format that uses another delimiter) such that each data sequence is identifiable independently. In this regard, it should be appreciated that the probabilistic data sequence validation apparatus 200 may maintain the received plurality of data sequences in a single data object or a plurality of data objects.

In some embodiments, the probabilistic data sequence validation apparatus 200 is configured to process each data sequence in the plurality of data sequences. In some such embodiments, the probabilistic data sequence validation apparatus 200 iterates through processing of each data sequence in the plurality of data sequence (e.g., starting from the beginning of the plurality of data sequences, or from another point). The probabilistic data sequence validation apparatus 200 may iterate through each of the plurality of data sequences for purposes of calculating a perplexity value set associated with the data sequence.

For example, at operation 1004, the probabilistic data sequence validation apparatus 200 includes means, such as the data sequence processing circuitry 210, communications circuitry 208, input/output circuitry 206, processor 202, and/or the like, or a combination thereof, configured for determining whether there remains a next data sequence in the plurality of data sequences that has not yet been processed. In a circumstance where the probabilistic data sequence validation apparatus 200 determines there is a next data sequence in the plurality of data sequences, flow proceeds to operation 1006. At operation 1006, the probabilistic data sequence validation apparatus 200 includes means, such as the data sequence processing circuitry 210, communications circuitry 208, input/output circuitry 206, processor 202, and/or the like, or a combination thereof, configured for calculating, utilizing a language model, a perplexity value set associated with the data sequence. In some embodiments, the probabilistic data sequence validation apparatus 200 maintains the language model for use within a particular language domain that matches the language domain of the data sequences. For example, in circumstances where the data sequences represent sentences from FTSE 100 press releases, the language model is trained on FTSE 100 press releases such that the calculated perplexity values embodied in the perplexity value set are based on the specific language domain of FTSE 100 press releases. It should be appreciated that this loop continues until no subsequent data sequences remain unprocessed. In a circumstance where, at operation 1004, the apparatus determines there is not a next data sequence that remains unprocessed, flow proceeds to operation 1008.

The language model may be configured to determine the perplexity value for each token in a particular data sequence in a particular manner. For example, in some embodiments, the language model is configured to determine the perplexity value for a particular token in the data sequence based on a left context and/or a right context associated with the particular token. In this regard, the perplexity value for the particular token may embody a probability the token appears next in the data sequence given the left and/or right context associated with the token. The language model may be configured to process a left context of a particular length (e.g., 12 tokens preceding, 2 tokens preceding, 0 tokens preceding, and the like) and/or a right context of the same or a different length (e.g., 7 tokens succeeding, 2 tokens succeeding, 0 tokens succeeding, and the like).

At operation 1008, the probabilistic data sequence validation apparatus 200 includes means, such as the data sequence processing circuitry 210, communications circuitry 208, input/output circuitry 206, processor 202, and/or the like, or a combination thereof, configured for generating a probabilistic ranking set for the plurality of data sequences. The probabilistic ranking set includes a probabilistic ranking corresponding to each data sequence of the plurality of data sequences. In some such embodiments, the probabilistic ranking set is generated based on at least one sequence arrangement metric and the perplexity value set for each data sequence of the plurality of data sequences. For example, in this regard, the sequence arrangement metric represents a data value generated via a particular algorithm, where the generated data value embodying the probabilistic ranking for a data sequence is based on the perplexity value set corresponding to the data sequence. Non-limiting examples of a sequence arrangement metric include an average sequence perplexity value, an area violating threshold value, and an unacceptable bucket count value, as described herein. It should be appreciated that in some embodiments, to generate the probabilistic ranking set for the plurality of data sequences, the probabilistic data sequence validation apparatus 200 iterates through applying the perplexity value set for each data sequence of the plurality of data sequences to a particular algorithm corresponding to the at least one sequence arrangement metric.

At optional operation 1010, the probabilistic data sequence validation apparatus 200 includes means, such as the data sequence processing circuitry 210, communications circuitry 208, input/output circuitry 206, processor 202, and/or the like, or a combination thereof, configured for generating an arrangement of the plurality of data sequences based on the probabilistic ranking set. In some such embodiments, the plurality of data sequences is arranged such that the data sequences associated with the highest probabilistic rankings are first in the arrangement. In this regard, the most surprising data sequences (e.g., those most likely to be invalid) are positioned earliest in the arrangement of data sequences. In this regard, the arrangement of the plurality of data sequences may represent a sorted version of the plurality of data sequences in descending order based on the probabilistic rankings (e.g., starting with the highest probabilistic ranking).

In some embodiments, the plurality of data sequences is arranged into an arrangement embodied by a second data object separate from the plurality of data sequences. Alternatively or additionally, in some embodiments, the plurality of data sequences is arranged within a particular data object without generation of a new data object (e.g., arranged in-place).

In some embodiments, the arrangement comprises or is associated with one or more grouped set(s) of data sequences. In this regard, in some such embodiments, some of the one or more grouped set(s) of data sequences may be provided to the user. In some such embodiments, the user may identify and/or otherwise select particular grouped set(s) of data sequences to output that is aligned with the goals of the user. For example, in some embodiments, the user may configure the probabilistic data sequence validation apparatus 200 to output only a grouped set including the data sequences determined most likely to be invalid (e.g., a grouped set of data sequences with the highest perplexity values).

In some embodiments, data sequences associated with perplexity value(s) that satisfy different threshold value(s) may be grouped together. In one example context, the plurality of data sequences are arranged into a first grouped set of data sequences that satisfy (e.g., by exceeding, in some embodiments) an unacceptable perplexity threshold, a second grouped set of data sequences that satisfy a soft perplexity threshold, a third grouped set of data sequences that satisfy an average, median, or other baseline perplexity associated with a particular language model, and a fourth grouped set of data sequences including all remaining data sequences. In other embodiments, one or more grouped set(s) of data sequences are generated based on percentile of perplexity value with respect to the plurality of data sequences (e.g., a first grouped set including the data sequences associated with perplexity values in the top 10 percentile of perplexity values, a second grouped set including the data sequences associated with perplexity values in the 10-20 percentile range of perplexity values, and so on).

At optional operation 1012, the probabilistic data sequence validation apparatus 200 includes means, such as the data sequence processing circuitry 210, communications circuitry 208, input/output circuitry 206, processor 202, and/or the like, or a combination thereof, configured for providing the arranged plurality of data sequences to a client device. In some such embodiments, the probabilistic data sequence validation apparatus 200 provides the arranged plurality of data sequences to the client device to cause rendering of at least the arranged plurality of data sequences to the client device. In this regard, the probabilistic data sequence validation apparatus 200 may cause rendering of one or more data sequence validation user interfaces that includes the arrangement of data sequences for viewing by a user of the client device. Alternatively or additionally, in some embodiments, the arranged plurality of data sequences is provided to the client device for outputting in any of a myriad of formats, such as via an audio output from the client device or a printout from the client device. It should be appreciated that, in some embodiments, the client device further processes the arranged plurality of data sequences to generate the output data, for example to output additional data together with the arranged plurality of data sequences (e.g., natural language data providing context for the arrangement) in a manner that identifies which data sequences in the arrangement are determined invalid or likely invalid.

In some embodiments, a portion of the arranged plurality of data sequences is provided to a client device. In some such embodiments, the probabilistic data sequence validation apparatus 200 may receive and/or otherwise associate particular configurations with the client device for providing the arrangement. For example, in some embodiments where the arrangement comprises or is associated with grouped set(s) of data sequences, only a portion of the grouped set(s) of data sequences are provided to the client device. The user of the client device may select particular grouped sets of interest to configure the probabilistic data sequence validation apparatus 200 to provide those grouped sets from the arrangement. For example, the user may configure the probabilistic data sequence validation apparatus 200 to output a certain number of data sequences with the highest perplexity values, data sequences associated with a perplexity value that satisfies a particular threshold value (e.g., an unacceptable perplexity threshold), or all data sequences of the arrangement.

In some embodiments, the arrangement of the plurality of data sequences is provided together with one or more of the determined and/or calculated data values associated therewith. For example, in some embodiments, the probabilistic data sequence validation apparatus 200 further provides the perplexity value set associated with each data sequence of the plurality of data sequences, such that the user of the client device may view and/or process the perplexity value for each token of a data sequence alone and/or with respect to a certain hard threshold limit, for example. Additionally or alternatively, in some embodiments, the probabilistic data sequence validation apparatus 200 further provides the probabilistic ranking set, such that the user of the client device may view and/or process the probabilistic ranking for a data sequence individually and/or within the context of the other data sequences of the plurality of data sequences. In some embodiments, the arrangement of the plurality of data sequences and/or any additional data to be provided therewith is provided from the probabilistic data sequence validation apparatus 200 to the client device via one or more specially configured transmissions including such data.

FIG. 11 illustrates a flowchart depicting example operations of an example process 1100 for identifying invalid data sequences from a set of data sequences as part of data sequence validity processing in accordance with at least some example embodiments of the present disclosure. In some such embodiments, the example process 1100 embodies one example computer-driven action that is performable based on the data generated and/or otherwise calculated as described herein. In some embodiments, the process 1100 is embodied by computer program code stored on a non-transitory computer-readable medium of a computer program product configured for execution to perform the computer-implemented process described. Alternatively or additionally, in some embodiments, the process 1100 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1100 is described with respect to performance by the probabilistic data sequence validation apparatus 200.

The process 1100 begins at operation 1102. In some embodiments, the process 1100 begins after one or more operations of another process, such as the operation 1010 of the process 1000 as depicted and described. Additionally or alternatively, in some embodiments, upon completion of the process 1100 flow proceeds to one or more operations of another process, such as the operation 1012 of the process 1000 as depicted and described. In other embodiments, the flow ends upon completion of the process 1100.

At operation 1102, the probabilistic data sequence validation apparatus 200 includes means, such as the data sequence processing circuitry 210, communications circuitry 208, input/output circuitry 206, processor 202, and/or the like, or a combination thereof, configured for identifying at least one invalid data sequence from the plurality of data sequences. In some embodiments, for example, the probabilistic data sequence validation apparatus 200 identifies at least one invalid data sequence based at least on the arranged plurality of data sequences and/or the probabilistic ranking set. For example, in some embodiments, the probabilistic data sequence validation apparatus 200 identifies a certain number of the arrangement of the plurality of data sequences as invalid in order starting from the beginning of the arrangement. In this regard, the probabilistic data sequence validation apparatus 200 identifies the most surprising data sequences (e.g., those having the highest probabilistic rankings, thus appearing first in the arrangement) as invalid.

Additionally or alternatively, in some embodiments, the probabilistic data sequence validation apparatus 200 identifies at least one invalid data sequence based on the probabilistic ranking(s) for the invalid data sequence(s). For example, in some embodiments, the probabilistic data sequence validation apparatus 200 maintains a probabilistic ranking threshold that serves as a maximum limit for a data sequence to remain valid. In some such embodiments, data sequences that fail to satisfy the probabilistic ranking threshold (e.g., by having a probabilistic ranking whose value exceeds the probabilistic ranking threshold) are identified as invalid. It should be appreciated that, in some embodiments, the probabilistic ranking threshold is set by a user (e.g., a user via a client device), determined by the probabilistic data sequence validation apparatus 200, and/or predetermined.

At optional operation 1104, the probabilistic data sequence validation apparatus 200 includes means, such as the data sequence processing circuitry 210, communications circuitry 208, input/output circuitry 206, processor 202, and/or the like, or a combination thereof, configured for providing the at least one invalid data sequence to a client device. In some embodiments, for example, the probabilistic data sequence validation apparatus 200 provides the at least one invalid data to cause rendering of the at least one invalid data sequence via the client device for the user. In this regard, the probabilistic data sequence validation apparatus 200 may cause rendering of the at least one invalid data sequence to the client device in a manner that visually distinguishes the at least one invalid data sequence from the remaining data sequences of the plurality of data sequences. In this regard, the invalid data sequences may be visually distinguished such that the user viewing the user interface may readily identify the data sequences identified as invalid.

Alternatively or additionally, in some embodiments, the probabilistic data sequence validation apparatus 200 provides the at least one invalid data sequence to the client device so as to enable the user of the client device to process and/or validate or confirm invalidity of the identified invalid data sequence. For example, in some such embodiments, the probabilistic data sequence validation apparatus 200 causes the client device to present the at least one invalid data sequence, and/or data associated therewith, together with interface elements for validating the data sequence identified as an invalid data sequence (e.g., indicating the data sequence was identified as invalid/in error), and/or confirming the invalidity of the data sequence identified as an invalid data sequence. It should be appreciated that, in some such embodiments, data sequences confirmed as invalid are further processed, for example removed from the plurality of data sequences, excluded, deleted, and/or otherwise manipulated to form a new data sequence. In some embodiments where a new data sequence is created, the probabilistic data sequence validation apparatus 200 may again process the new data sequence in the manner described.

FIG. 12 illustrates a flowchart depicting example operations of an example process for removing invalid data sequences from a set of data sequences as part of data sequence validity processing in accordance with at least some example embodiments of the present disclosure. In some such embodiments, the example process 1200 embodies another example computer-driven action that is performable based on the data generated and/or otherwise calculated as described herein. In some embodiments, the process 1200 is embodied by computer program code stored on a non-transitory computer-readable medium of a computer program product configured for execution to perform the computer-implemented process described. Alternatively or additionally, in some embodiments, the process 1200 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1200 is described with respect to performance by the probabilistic data sequence validation apparatus 200.

The process 1200 begins at operation 1202. In some embodiments, the process 1200 begins after one or more operations of another process, such as the operation 1010 of the process 1000 as depicted and described. Additionally or alternatively, in some embodiments, upon completion of the process 1200, flow proceeds to one or more operations of another process, such as the operation 1012 of the process 1000 as depicted and described. In other embodiments, the flow ends upon completion of the process 1200.

At operation 1202, the probabilistic data sequence validation apparatus 200 includes means, such as the data sequence processing circuitry 210, communications circuitry 208, input/output circuitry 206, processor 202, and/or the like, or a combination thereof, configured for excluding at least one invalid data sequence from the plurality of data sequences. In some such embodiments, the at least one invalid data sequence is removed from the arrangement of the plurality of data sequences and/or otherwise permanently deleted from memory. In some embodiments, the probabilistic data sequence validation apparatus 200 excludes the at least one invalid data sequence based on the arranged plurality of data sequences and/or the probabilistic ranking set associated with the plurality of data sequences. For example, in some embodiments, the probabilistic data sequence validation apparatus 200 excludes or filters a certain number of data sequences from the arrangement of the plurality of data sequences as invalid in order, starting from the beginning of the arrangement. In this regard, the probabilistic data sequence validation apparatus 200 excludes or filters the most surprising data sequences (e.g., those having the highest probabilistic rankings, thus appearing first in the arrangement) as invalid.

Additionally or alternatively, in some embodiments, the probabilistic data sequence validation apparatus 200 identifies the at least one invalid data sequence based on the probabilistic ranking(s) for the invalid data sequence(s), and excludes such at least one invalid data sequence. In this regard, the probabilistic data sequence validation apparatus 200 may identify the at least one invalid data sequence from the plurality of data sequences as described with respect to operation 1102, and exclude such identified invalid data sequences from the plurality of data sequences. For example, in some embodiments, the probabilistic data sequence validation apparatus 200 excludes at least one invalid data sequence from the plurality of data sequences based on a maintained probabilistic ranking threshold.

At optional operation 1204, the probabilistic data sequence validation apparatus 200 includes means, such as the data sequence processing circuitry 210, communications circuitry 208, input/output circuitry 206, processor 202, and/or the like, or a combination thereof, configured for providing the remaining data sequences of the plurality of data sequences to a client device. In some such embodiments, for example, the probabilistic data sequence validation apparatus 200 provides the remaining data sequences to cause rendering of the remaining data sequences via the client device. In this regard, the probabilistic data sequence validation apparatus 200 may cause rendering of the remaining data sequences to the client device such that the user of the client device may view the remaining data sequences and/or process the remaining data sequences for validation.

FIG. 13 illustrates a flowchart depicting example operations of an example process 1300 for generating a probabilistic ranking set based on mean perplexity values as part of data sequence validity processing in accordance with at least some example embodiments of the present disclosure. Specifically, the example process 1300 depicts example operations for generating a mean probabilistic ranking set embodying a probabilistic ranking set for a plurality of data sequences. In some embodiments, the process 1300 is embodied by computer program code stored on a non-transitory computer-readable medium of a computer program product configured for execution to perform the computer-implemented process described. Alternatively or additionally, in some embodiments, the process 1300 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1300 is described with respect to performance by the probabilistic data sequence validation apparatus 200.

The process 1300 begins at operation 1302. In some embodiments, the process 1300 begins after one or more operations of another process, such as the operation 1004 of the process 1000 as depicted and described. Additionally or alternatively, in some embodiments, upon completion of the process 1300, flow proceeds to one or more operations of another process, such as the operation 1010 of the process 1000 as depicted and described. In other embodiments, the flow ends upon completion of the process 1300.

In some embodiments, the probabilistic data sequence validation apparatus 200 is configured to generate an average sequence perplexity value for each data sequence of the plurality of data sequences. In this regard, in some such embodiments, the probabilistic data sequence validation apparatus 200 is configured to iterate through processing the perplexity value set associated with each data sequence in the plurality of data sequences (e.g., starting from the beginning of the plurality of data sequences, or from another point). The probabilistic data sequence validation apparatus 200 may iterate through each of the plurality of data sequences for purposes of calculating the average sequence perplexity value for the data sequence based on the perplexity value set corresponding to the data sequence.

For example, at operation 1302, the probabilistic data sequence validation apparatus 200 includes means, such as the data sequence processing circuitry 210, communications circuitry 208, input/output circuitry 206, processor 202, and/or the like, or a combination thereof, configured for determining whether there remains a next data sequence in the plurality of data sequences that has not yet been processed. In a circumstance where the probabilistic data sequence validation apparatus 200 determines there is a next data sequence in the plurality of data sequences that has not been processed (e.g., an average sequence perplexity value for the data sequence has not yet been generated), flow proceeds to operation 1304. At operation 1304, the probabilistic data sequence validation apparatus 200 includes means, such as the data sequence processing circuitry 210, communications circuitry 208, input/output circuitry 206, processor 202, and/or the like, or a combination thereof, configured for generating an average sequence perplexity value for the data sequence. The average sequence perplexity value is generated based on the perplexity value set for the data sequence being processed. In this regard, the mean perplexity value represents an overall perplexity associated with the data sequence being processed. A non-limiting example of generating an average sequence perplexity value for a data sequence is described with respect to FIG. 14. In some embodiments, the average sequence perplexity value generated for the data sequence is stored to an average sequence perplexity values set that stores the average sequence perplexity value for each data sequence associated with the corresponding data sequence.

In a circumstance where, at operation 1302, the probabilistic data sequence validation apparatus 200 determines there is not a next data sequence that remains unprocessed, the flow ends. In some such embodiments, the generated mean sequence perplexity value set including each of generated mean sequence perplexity value corresponding to a particular data sequence embodies the probabilistic rankings set. In some other embodiments, the probabilistic data sequence validation apparatus 200 further processes the average sequence perplexity values set embodying the probabilistic rankings set. For example, in some embodiments, the probabilistic data sequence validation apparatus 200 normalizes the average sequence perplexity values embodied in the average sequence perplexity values set for purposes of ranking the plurality of data sequences.

FIG. 14 illustrates a flowchart depicting example operations of an example process 1400 for generating a mean perplexity value for a data sequence as part of data sequence validity processing in accordance with at least some example embodiments of the present disclosure. In some embodiments, the process 1400 is embodied by computer program code stored on a non-transitory computer-readable medium of a computer program product configured for execution to perform the computer-implemented process described. Alternatively or additionally, in some embodiments, the process 1400 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1400 is described with respect to performance by the probabilistic data sequence validation apparatus 200.

The process 1400 begins at operation 1402. In some embodiments, the process 1400 begins after one or more operations of another process, such as the operation 1302 of the process 1000 as depicted and described. Additionally or alternatively, in some embodiments, upon completion of the process 1400, flow proceeds to one or more operations of another process, such as the operation 1302 of the process 1300 as depicted and described for determining whether to process a next data sequence. In other embodiments, the flow ends upon completion of the process 1400.

In some embodiments, the probabilistic data sequence validation apparatus 200 is configured to generate a perplexity value for each token in a token sequence embodying a data sequence. In this regard, in some such embodiments, the probabilistic data sequence validation apparatus 200 is configured to iterate through processing each token to determine a corresponding perplexity value to generate a total perplexity value for the data sequence. In this regard, the probabilistic data sequence validation apparatus 200 may iterate through each token in the token sequence embodying the data sequence for purposes of calculating the total perplexity for the data sequence based on a perplexity value generated for each token.

For example, at operation 1402, the probabilistic data sequence validation apparatus 200 includes means, such as the data sequence processing circuitry 210, communications circuitry 208, input/output circuitry 206, processor 202, and/or the like, or a combination thereof, configured for determining whether there remains a next token in the token sequence embodying the data sequence that has not yet been processed. In a circumstance where the probabilistic data sequence validation apparatus 200 determines there is a next token in the token sequence embodying the data sequence that has not been processed (e.g., a perplexity value for the next token has not been generated and/or added to a total perplexity value for the data sequence), flow proceeds to operation 1404.

At operation 1404, the probabilistic data sequence validation apparatus 200 includes means, such as the data sequence processing circuitry 210, communications circuitry 208, input/output circuitry 206, processor 202, and/or the like, or a combination thereof, configured for determining a perplexity value for the next token in the data sequence. In some embodiments, the probabilistic data sequence validation apparatus 200 applies the next token to a language model to determine the perplexity value for the next token. In some such embodiments, the next token is applied together with one or more additional tokens, for example tokens embodying a left context (e.g., a historical token context for previous tokens in the data sequence) and/or a right context (e.g., a future token context for subsequent tokens in the data sequence). In this regard, the language model outputs the perplexity value for the next token based on the inputs. In some embodiments, the language model is configured to output perplexity values based on data alone, whereas in other embodiments the language model is optionally further configured based on supplemental data.

At operation 1406, the probabilistic data sequence validation apparatus 200 includes means, such as the data sequence processing circuitry 210, communications circuitry 208, input/output circuitry 206, processor 202, and/or the like, or a combination thereof, configured for adding the perplexity value for the next token to a total perplexity for the data sequence. In this regard, the total perplexity for the data sequence embodies a running total for as each token is processed. It should be appreciated that the total perplexity begins at zero, or another baseline value, and is subsequently increased as each token is processed to determine a corresponding perplexity value for that token at operation 1404.

In a circumstance where, at operation 1402, the probabilistic data sequence validation apparatus 200 determines there is not a next token in the token sequence embodying the data sequence that remains unprocessed, flow proceeds to operation 1408. In a circumstance where the probabilistic data sequence validation apparatus 200 determines there is not a next token in the token sequence embodying the data sequence that remains unprocessed, the total perplexity for the data sequence represents an aggregated and/or otherwise summed total value of all perplexity values for each token in the token sequence. Accordingly, the total perplexity for the data sequence is complete at the time no tokens remain in the token sequence embodying the data sequence.

At operation 1408, the probabilistic data sequence validation apparatus 200 includes means, such as the data sequence processing circuitry 210, communications circuitry 208, input/output circuitry 206, processor 202, and/or the like, or a combination thereof, configured for dividing the total perplexity for the data sequence by the length of the data sequence. In this regard, the result of the total perplexity for the data sequence divided by the length of the data sequence embodies the average sequence perplexity value for the data sequence. In some such embodiments, the probabilistic data sequence validation apparatus 200 determines the length of the data sequence based on the total number of tokens in the token sequence embodying the data sequence. In some embodiments, for example, the probabilistic data sequence validation apparatus 200 is configured to identify and/or otherwise retrieve a data property representing the length of the data sequence. Alternatively or additionally, in some embodiments, the probabilistic data sequence validation apparatus 200 tracks and/or otherwise increments a counter representing the length of the data sequence as each token is processed as described with respect to operations 1402, 1404, and 1406.

FIG. 15 illustrates a flowchart depicting example operations of an example process 1500 for generating a probabilistic ranking set based on area violating threshold values as part of data sequence validity processing in accordance with at least some example embodiments of the present disclosure. Specifically, the example process 1500 depicts example operations for generating an area violating threshold values set for a plurality of data sequences.

In some embodiments, the process 1500 is embodied by computer program code stored on a non-transitory computer-readable medium of a computer program product configured for execution to perform the computer-implemented process described. Alternatively or additionally, in some embodiments, the process 1500 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1500 is described with respect to performance by the probabilistic data sequence validation apparatus 200.

The process 1500 begins at operation 1502. In some embodiments, the process 1500 begins after one or more operations of another process, such as the operation 1004 of the process 1000 as depicted and described. Additionally or alternatively, in some embodiments, upon completion of the process 1500, flow proceeds to one or more operations of another process, such as the operation 1010 of the process

1000 as depicted and described. In other embodiments, the flow ends upon completion of the process 1500.

In some embodiments, the probabilistic data sequence validation apparatus 200 is configured to generate an area violating threshold value for each data sequence of the plurality of data sequences. In this regard, in some such embodiments, the probabilistic data sequence validation apparatus 200 is configured to iterate through processing the perplexity value set associated with each data sequence in the plurality of data sequences (e.g., starting from the beginning of the data sequences, or from another point). The probabilistic data sequence validation apparatus 200 may iterate through each of the plurality of data sequences for purposes of calculating the area violating threshold value for the data sequence based on the perplexity value set corresponding to the data sequence.

For example, at operation 1502, the probabilistic data sequence validation apparatus 200 includes means, such as the data sequence processing circuitry 210, communications circuitry 208, input/output circuitry 206, processor 202, and/or the like, or a combination thereof, configured for determining whether there remains a next data sequence in the plurality of data sequences that has not yet been processed. In a circumstance where the probabilistic data sequence validation apparatus 200 determines there is a next data sequence in the plurality of data sequences that has not yet been processed (e.g., an area violating threshold value for the data sequence has not yet been generated), flow proceeds to operation 1504.

At operation 1504, the probabilistic data sequence validation apparatus 200 includes means, such as the data sequence processing circuitry 210, communications circuitry 208, input/output circuitry 206, processor 202, and/or the like, or a combination thereof, configured for determining an area violating threshold value for the data sequence. The area violating threshold value for the data sequence is determined based on the perplexity value set for the data sequence and an unacceptable perplexity threshold. In this regard, the area violating threshold value represents an overall perplexity associated with the data sequence being processed that does not satisfy the unacceptable perplexity threshold (e.g., an area formed above and/or below one or more unacceptable perplexity thresholds). For example, in some embodiments, the probabilistic data sequence validation apparatus 200 determines the total area above the unacceptable perplexity threshold resulting from the perplexity values embodied in the perplexity value set for the data sequence. It should be appreciated that any of a number of known area determination algorithms for sequential data may be utilized for determining the area violating threshold value for a particular data sequence based on the corresponding perplexity value set associated with the token sequence embodying the data sequence.

The unacceptable perplexity threshold(s) may be set in any of a myriad of manners. For example, in some embodiments, an unacceptable perplexity threshold is set based on a soft perplexity threshold, such as a model perplexity value corresponding to the language model utilized to generate the one or more token perplexities. In some embodiments, for example, one or more unacceptable perplexity thresholds are set at an order of magnitude higher than the soft perplexity threshold. In other embodiments, for example, one or more unacceptable perplexity thresholds are set at double the soft perplexity threshold for a particular language model. Additionally or alternatively, in some embodiments, one or more perplexity allowances are provided for tokens with minimal surrounding context. For example, a perplexity allowance may offset one or more portions of the unacceptable perplexity threshold and/or soft perplexity threshold for the first 3 tokens of a data sequence (e.g., which do not have sufficient preceding context) and/or last three tokens of a data sequence (e.g., which do not have sufficient succeeding context).

In some such embodiments, the area violating threshold value determined for the data sequence is stored to an area violating threshold values set that represents the area violating threshold value for each data sequence in the plurality of data sequences. In a circumstance where, at operation 1502, the probabilistic data sequence validation apparatus 200 determines there is not a next data sequence that remains unprocessed, the flow ends. In some such embodiments, the generated area violating threshold values set including each determined area violating threshold value corresponding to a particular data sequence embodies the probabilistic rankings set. In some other embodiments, the probabilistic data sequence validation apparatus 200 further processes the area violating threshold values set embodying the probabilistic rankings set. area violating threshold value FIG. 16 illustrates a flowchart depicting example operations of an example process for generating a probabilistic ranking set based bucket-based sequence perplexity values as part of data sequence validity processing in accordance with at least some example embodiments of the present disclosure. Specifically, the example process 1600 depicts example operations for generating an unacceptable bucket count values set for a plurality of data sequences.

In some embodiments, the process 1600 is embodied by computer program code stored on a non-transitory computer-readable medium of a computer program product configured for execution to perform the computer-implemented process described. Alternatively or additionally, in some embodiments, the process 1600 is performed by one or more specially configured apparatuses, such as the probabilistic data sequence validation apparatus 200, alone or in communication with one or more other computing device(s). In some such embodiments, the probabilistic data sequence validation apparatus 200 is specially configured by computer program instructions stored thereon, for example in the memory 204 and/or another set of circuitry as depicted and described herein, and/or otherwise accessible to the probabilistic data sequence validation apparatus 200 for performing the operations depicted and described. In some embodiments, the specially configured probabilistic data sequence validation apparatus 200 is in communication with one or more external apparatus(es), system(s), computing device(s), and/or the like, to perform one or more of the operations as depicted and described. For purposes of description, the process 1600 is described with respect to performance by the probabilistic data sequence validation apparatus 200.

The process 1600 begins at operation 1602. In some embodiments, the process 1600 begins after one or more operations of another process, such as the operation 1004 of the process 1000 as depicted and described. Additionally or alternatively, in some embodiments, upon completion of the process 1600, flow proceeds to one or more operations of another process, such as the operation 1010 of the process 1000 as depicted and described. In other embodiments, the flow ends upon completion of the process 1600.

In some embodiments, the probabilistic data sequence validation apparatus 200 is configured to determine an unacceptable bucket count value for each data sequence of the plurality of data sequences. In this regard, in some such embodiments, the probabilistic data sequence validation apparatus 200 is configured to iterate through processing the perplexity value set associated with each data sequence in the plurality of data sequences (e.g., starting from the beginning of the data sequences, or from another point). The probabilistic data sequence validation apparatus 200 may iterate through each of the plurality of data sequences for purposes of calculating the unacceptable bucket count value for the data sequence based on the perplexity value set corresponding to the data sequence.

For example, at operation 1602, the probabilistic data sequence validation apparatus 200 includes means, such as the data sequence processing circuitry 210, communications circuitry 208, input/output circuitry 206, processor 202, and/or the like, or a combination thereof, configured for determining whether there remains a next data sequence in the plurality of data sequences that has not yet been processed. In a circumstance where the probabilistic data sequence validation apparatus 200 determines there is a next data sequence in the plurality of data sequences that has not yet been processed (e.g., an unacceptable bucket count value for the data sequence has not yet been generated), flow proceeds to operation 1604.

At operation 1604, the probabilistic data sequence validation apparatus 200 includes means, such as the data sequence processing circuitry 210, communications circuitry 208, input/output circuitry 206, processor 202, and/or the like, or a combination thereof, configured for determining an unacceptable bucket token count associated with the data sequence. The unacceptable bucket token count is determined based on the perplexity value set for the data sequence. In this regard, the unacceptable bucket token count represents or otherwise includes a number of perplexity values falling within each of a number of unacceptable buckets. In some embodiments, the probabilistic data sequence validation apparatus 200 maintains determinable unacceptable bucket(s), user-set unacceptable bucket(s), and/or otherwise predetermined unacceptable bucket(s). In this regard, in some embodiments, the probabilistic data sequence validation apparatus 200 iterates through each perplexity value in the perplexity value set corresponding to the data sequence. In this regard, in a circumstance where the probabilistic data sequence validation apparatus 200 determines a perplexity value for a particular token falls within a particular unacceptable bucket, the probabilistic data sequence validation apparatus 200 may increment a portion of the unacceptable bucket token count corresponding to the particular unacceptable bucket. In this regard, upon completing iteration of all perplexity values, the unacceptable bucket token count represents the total number of tokens associated with a perplexity value that falls into each unacceptable bucket. It should be appreciated that, as described herein, the unacceptable bucket token count represents the number for each unacceptable bucket separately, for example based on order of magnitude associated with the unacceptable bucket, such that the a particular count for each unacceptable bucket of various orders of magnitude are separately determinable.

At operation 1606, the probabilistic data sequence validation apparatus 200 includes means, such as the data sequence processing circuitry 210, communications circuitry 208, input/output circuitry 206, processor 202, and/or the like, or a combination thereof, configured for determining the unacceptable bucket count value for the data sequence based at least on the unacceptable bucket token count associated with the data sequence. In some embodiments, for example, the unacceptable bucket token count is utilized as input to an unacceptable bucket count value algorithm. For example, in some embodiments, the unacceptable bucket count value is determined utilizing a weighted algorithm, such as where the weights are proportional to the order of magnitude for each unacceptable bucket. In this regard, the unacceptable bucket count value represents an overall perplexity associated with the data sequence being processed based on perplexity value(s) that fall within the particular unacceptable buckets.

A non-limiting example of such an algorithm for determining an unacceptable bucket count value comprises the equation:

$$a = \frac{1}{m}\sum_{i=0}^{n} 10^i C_i, \qquad \text{EQUATION 5}$$

In this equation, a represents the unacceptable bucket count value embodying a probabilistic ranking for the particular data sequence. Further, m represents the number of tokens in the particular data sequence. Further, i represents the order of the unacceptable bucket. Further, n represents a number of unacceptable buckets minus 1. Further, $C_i$ represents a number of tokens in an unacceptable bucket of the order of magnitude represented by i. In this equation, the unacceptable buckets with higher order of magnitude are weighted more heavily for purposes of determining the corresponding unacceptable bucket count value.

In a circumstance where, at operation 1602, the probabilistic data sequence validation apparatus 200 determines there is not a next data sequence that remains unprocessed, the flow ends. In some such embodiments, the generated unacceptable bucket count values set including each determined unacceptable bucket count value corresponding to a particular data sequence embodies the probabilistic rankings set. In some other embodiments, the probabilistic data sequence validation apparatus 200 further processes the unacceptable bucket count values set embodying the probabilistic rankings set. For example, in some embodiments, the probabilistic data sequence validation apparatus 200 normalizes the individual token perplexities for purposes of determining each unacceptable bucket count value of the unacceptable bucket count values set for purposes of ranking the plurality of data sequences.

It should be appreciated that, in other embodiments, one or more other metrics may be defined for purposes of ranking data sequences and/or data tokens, grouping data sequences and/or data tokens, and/or the like. In this regard, other such metrics may be derived from perplexity and/or other probabilistic values. For example, a maximum perplexity value may be defined that is utilized to rank data sequences accordingly. Alternatively or additionally, in some embodiments, data sequences are grouped (e.g., into a set of valid data sequences and a set of invalid data sequences) based on a determination of whether a maximum perplexity value satisfies (e.g., exceeds) a maximum perplexity threshold indicating invalidity. In some embodiments, the metric is defined by any user-configured algorithm that the user has identified as indicating validity or invalidity of a particular data sequence. The example metrics depicted and described should not limit the scope and spirit of this disclosure.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory, the at least one memory having computer-coded instructions stored thereon, wherein the computer-coded instructions, in execution with the at least one processor, configures the apparatus to:
   for each data sequence of a plurality of data sequences, each data sequence comprising a token sequence:
      generate, utilizing a language model, a perplexity value set associated with the data sequence, wherein the perplexity value set comprises a perplexity value for each data token in the token sequence of the data sequence, wherein the language model comprises a trained machine learning model configured to generate the perplexity value for each data token; and
   generate a probabilistic ranking set for the plurality of data sequences, the probabilistic ranking set including a probabilistic ranking for each data sequence in the plurality of data sequences, and the probabilistic ranking set generated based at least in part on at least one sequence arrangement metric and the perplexity value set for each data sequence of the plurality of data sequences, wherein generating the probabilistic ranking set comprises:
      generating a bucket-based sequence perplexity value set including a bucket-based sequence perplexity value for each data sequence of the plurality of data sequences by, for each data sequence of the plurality of data sequences:
         determining an unacceptable bucket token count associated with the data sequence;
         determining the bucket-based sequence perplexity values for the data sequence based at least in part on the unacceptable bucket token count associated with the data sequence; and
         generating the probabilistic ranking set based at least in part on the bucket-based sequence perplexity value set; and
   generate an arrangement of the plurality of data sequences based at least in part on the probabilistic ranking set.

2. The apparatus according to claim 1, the apparatus further configured to:
   provide the arrangement of the plurality of data sequences to a client device for output configured for rendering via a display interface of the client device or audio output from the client device.

3. The apparatus according to claim 1, the apparatus further configured to:
   identify, based at least in part on the arrangement of the plurality of data sequences, at least one invalid data sequence from the plurality of data sequences.

4. The apparatus according to claim 1, the apparatus further configured to:
   exclude at least one data sequence from the plurality of data sequences based at least in part on the arrangement of the plurality of data sequences.

5. The apparatus according to claim 1, wherein the language model is trained on a domain-specific set of language training data.

6. The apparatus according to claim 1, wherein to generate the probabilistic ranking set for the plurality of data sequences based at least in part on at least one sequence arrangement metric and the perplexity value set for each data sequence, the apparatus is configured to:
   generate an average sequence perplexity value set including an average sequence perplexity value for each data sequence of the plurality of data sequences by, for each data sequence of the plurality of data sequences:
      determining the average sequence perplexity value for the data sequence, wherein the average sequence perplexity value represents a mean value based at least in part on the perplexity value for each data token in the token sequence of the data sequence; and
   generate the probabilistic ranking set based at least in part on the average sequence perplexity value set.

7. The apparatus according to claim 1, wherein to generate the probabilistic ranking set for the plurality of data sequences based at least in part on at least one sequence arrangement metric and the perplexity value set for each data sequence the apparatus is configured to:
   generate an area violating threshold value set including an area violating threshold value for each data sequence of the plurality of data sequences by, for each data sequence of the plurality of data sequences:

determining the area violating threshold value for the data sequence, wherein the area violating threshold value is based at least in part on the perplexity value set for the data sequence and an unacceptable perplexity threshold; and generating the probabilistic ranking set based at least in part on the area violating threshold value set.

8. The apparatus according to claim 1, wherein the probabilistic ranking set is determined utilizing the equation:

$$a = \frac{1}{m}\sum_{i=0}^{n}(X^i)C_i,$$

wherein X represents a number greater than one, a represents the probabilistic ranking for a particular data sequence of the plurality of data sequences, m represents a number of tokens in the particular data sequence, i represents an order of unacceptable buckets, n represents a number of unacceptable buckets minus 1, and $C_i$ represents a number of tokens in an unacceptable bucket represented by i.

9. The apparatus according to claim 1, wherein the language model is language agnostic and direction agnostic.

10. The apparatus according to claim 1, further configured to:
collect a set of training data sequences associated with a language domain, wherein the set of training data sequences is collected from one or more external computing devices associated with the language domain; and
train the language model based at least in part on the set of training data.

11. A computer-implemented method comprising:
for each data sequence of a plurality of data sequences, each data sequence comprising a token sequence:
generating, utilizing a language model, a perplexity value set associated with the data sequence, wherein the perplexity value set comprises a perplexity value for each data token in the token sequence of the data sequence, wherein the language model comprises a trained machine learning model configured to generate the perplexity value for each data token; and
generating a probabilistic ranking set for the plurality of data sequences, the probabilistic ranking set including a probabilistic ranking for each data sequence in the plurality of data sequences, and the probabilistic ranking set generated based at least in part on at least one sequence arrangement metric and the perplexity value set for each data sequence of the plurality of data sequences, wherein generating the probabilistic ranking set comprises:
generating a bucket-based sequence perplexity value set including a bucket-based sequence perplexity value for each data sequence of the plurality of data sequences by, for each data sequence of the plurality of data sequences:
determining an unacceptable bucket token count associated with the data sequence;
determining the bucket-based sequence perplexity values for the data sequence based at least in part on the unacceptable bucket token count associated with the data sequence; and
generating the probabilistic ranking set based at least in part on the bucket-based sequence perplexity value set; and generating an arrangement of the plurality of data sequences based at least in part on the probabilistic ranking set.

12. The computer-implemented method according to claim 11, the computer-implemented method further comprising:
providing the arrangement of the plurality of data sequences to a client device for output configured for rendering via a display interface of the client device or audio output from the client device.

13. The computer-implemented method according to claim 11, the computer-implemented method further comprising:
identifying, based at least in part on the arrangement of the plurality of data sequences, at least one invalid data sequence from the plurality of data sequences.

14. The computer-implemented method according to claim 11, wherein generating the probabilistic ranking set for the plurality of data sequences based at least in part on at least one sequence arrangement metric and the perplexity value set for each data sequence comprises:
generating an average sequence perplexity value set including an average sequence perplexity value for each data sequence of the plurality of data sequences by, for each data sequence of the plurality of data sequences:
determining the average sequence perplexity value for the data sequence, wherein the average sequence perplexity value represents a mean value based at least in part on the perplexity value for each data token in the token sequence of the data sequence; and
generating the probabilistic ranking set based at least in part on the average sequence perplexity value set.

15. The computer-implemented method according to claim 11, wherein generating the probabilistic ranking set for the plurality of data sequences based at least in part on at least one sequence arrangement metric and the perplexity value set for each data sequence comprises:
generating an area violating threshold value set including an area violating threshold value for each data sequence of the plurality of data sequences by, for each data sequence of the plurality of data sequences:
determining the area violating threshold value for the data sequence, wherein the area violating threshold value is based at least in part on the perplexity value set for the data sequence and an unacceptable perplexity threshold; and
generating the probabilistic ranking set based at least in part on the area violating threshold value set.

16. The computer-implemented method according to claim 12, wherein the probabilistic ranking set is determined utilizing the equation:

$$a = \frac{1}{m}\sum_{i=0}^{n}(X^i)C_i,$$

wherein X represents a number greater than one, a represents the probabilistic ranking for a particular data sequence of the plurality of data sequences, m represents a number of tokens in the particular data sequence, i represents an order of unacceptable buckets, n represents a number of unacceptable buckets minus 1, and $C_i$ represents a number of tokens in an unacceptable bucket represented by i.

17. A computer program product comprising at least one non-transitory computer-readable storage medium having computer program code stored thereon, the computer program code, in execution with at least one processor, configured for:

for each data sequence of a plurality of data sequences, each data sequence comprising a token sequence:
generating, utilizing a language model, a perplexity value set associated with the data sequence, wherein the perplexity value set comprises a perplexity value for each data token in the token sequence of the data sequence, wherein the language model comprises a trained machine learning model configured to generate the perplexity value for each data token; and
generating a probabilistic ranking set for the plurality of data sequences, the probabilistic ranking set including a probabilistic ranking for each data sequence in the plurality of data sequences, and the probabilistic ranking set generated based at least in part on at least one sequence arrangement metric and the perplexity value set for each data sequence of the plurality of data sequences, wherein generating the probabilistic ranking set comprises:
generating a bucket-based sequence perplexity value set including a bucket-based sequence perplexity value for each data sequence of the plurality of data sequences by, for each data sequence of the plurality of data sequences:
determining an unacceptable bucket token count associated with the data sequence;
determining the bucket-based sequence perplexity values for the data sequence based at least in part on the unacceptable bucket token count associated with the data sequence; and
generating the probabilistic ranking set based at least in part on the bucket-based sequence perplexity value set; and
generating an arrangement of the plurality of data sequences based at least in part on the probabilistic ranking set.

18. The computer program product according to claim 17, the computer program product further configured for:
providing the arrangement of the plurality of data sequences to a client device for output configured for rendering via a display interface of the client device or audio output from the client device.

* * * * *

UNITED STATES PATENT AND TRADEMARK OFFICE
CERTIFICATE OF CORRECTION

PATENT NO. : 11,699,434 B2
APPLICATION NO. : 17/112670
DATED : July 11, 2023
INVENTOR(S) : De Paiva et al.

It is certified that error appears in the above-identified patent and that said Letters Patent is hereby corrected as shown below:

In the Claims

Column 52,
Line 54, in Claim 16, "claim 12" should read --claim 11--.

Signed and Sealed this
Sixteenth Day of April, 2024

Katherine Kelly Vidal
Director of the United States Patent and Trademark Office